United States Patent
Yokohara et al.

(10) Patent No.: US 10,295,243 B2
(45) Date of Patent: May 21, 2019

(54) REFRIGERATION DEVICE FOR CONTAINER

(71) Applicant: DAIKIN INDUSTRIES, LTD., Osaka-shi, Osaka (JP)

(72) Inventors: Kazuma Yokohara, Osaka (JP); Masataka Nakano, Osaka (JP); Noritaka Kamei, Osaka (JP); Naohiro Tanaka, Osaka (JP); Atsushi Ozato, Osaka (JP); Yuusuke Fujimoto, Osaka (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 133 days.

(21) Appl. No.: 15/551,135

(22) PCT Filed: Jan. 15, 2016

(86) PCT No.: PCT/JP2016/000211
§ 371 (c)(1),
(2) Date: Aug. 15, 2017

(87) PCT Pub. No.: WO2016/136125
PCT Pub. Date: Sep. 1, 2016

(65) Prior Publication Data
US 2018/0038625 A1 Feb. 8, 2018

(30) Foreign Application Priority Data
Feb. 27, 2015 (JP) .................................. 2015-039260

(51) Int. Cl.
F25D 17/00 (2006.01)
F25D 17/04 (2006.01)
(Continued)

(52) U.S. Cl.
CPC ............ F25D 17/045 (2013.01); A23B 7/148 (2013.01); A23L 3/3418 (2013.01);
(Continued)

(58) Field of Classification Search
CPC ........ F25D 17/042; F25D 11/003; F24F 3/12; F24F 3/16; F24F 2003/1692; A23L 3/3418; A23L 3/3445; A23L 3/36; A23V 2002/00
See application file for complete search history.

(56) References Cited

U.S. PATENT DOCUMENTS 5,457,963 A * 10/1995 Cahill-O'Brien ...... A23B 7/148
62/78

FOREIGN PATENT DOCUMENTS

JP 2-84132 A 3/1990
JP 7-313052 A 12/1995
(Continued)

OTHER PUBLICATIONS

International Search Report for PCT/JP2016/000211 (PCT/ISA/210) dated Apr. 5, 2016.

*Primary Examiner* — Keith M Raymond
*Assistant Examiner* — Kamran Tavakoldavani
(74) *Attorney, Agent, or Firm* — Birch, Stewart, Kolasch & Birch, LLP

(57) ABSTRACT

A gas supply device is configured such that its supply state is switchable between a first supply state supplying, as supply air, nitrogen-enriched air produced from outside air into a containe, and a second supply state in which the gas supply device takes outside air therein and supplies, as supply air, the outside air into the container. A CA system is provided with a branch pipe which guides at least part of the supply air flowing through a supply passage to an oxygen sensor, and an open/close valve which opens/closes the
(Continued)

branch pipe. An outside air calibration operation is performed in which the open/close valve is opened in the second supply state to guide the least part of the outside air flowing through the supply passage to the oxygen sensor, thereby calibrating the oxygen sensor using the outside air.

10 Claims, 14 Drawing Sheets

(51) Int. Cl.
  *A23L 3/3418* (2006.01)
  *A23B 7/148* (2006.01)
  *F25D 11/00* (2006.01)
  *F25D 17/06* (2006.01)
  *F25D 29/00* (2006.01)
(52) U.S. Cl.
  CPC ............ *F25D 11/003* (2013.01); *F25D 17/06* (2013.01); *F25D 29/003* (2013.01); *F25D 2317/041* (2013.01)

(56) References Cited

FOREIGN PATENT DOCUMENTS

| JP | 7-324788 A | 12/1995 |
| JP | 8-168 A | 1/1996 |

* cited by examiner

US 10,295,243 B2

REFRIGERATION DEVICE FOR CONTAINER

TECHNICAL FIELD

The present invention relates to a container refrigeration apparatus which controls the temperature and composition of air in a container to a desired state.

BACKGROUND ART

Various measures have been taken to store plants (e.g., fruits and vegetables) in a container used, e.g., in marine transportation for a long period of time while keeping the plants fresh. As an example of such measures, a technique for keeping freshness of plants, while taking the fact into account that freshness of plants considerably decreases as they breathe, has been known. In this technique, gas having a lower oxygen concentration than the outside air is supplied into the container to decrease the oxygen concentration of the air in the container, thereby reducing the breathing of the plants and keeping the plants fresh (see, e.g., Patent Document 1 below).

According to Patent Document 1, while the air in the container is cooled, an adsorbent column filled with a nitrogen adsorbent is used to produce nitrogen-enriched air having a lower oxygen concentration and a higher nitrogen concentration than outside air, and this nitrogen-enriched air is supplied into the container to reduce the oxygen concentration of the air in the container, making it easier to keep the plants fresh.

CITATION LIST

Patent Document

Patent Document 1: Japanese Unexamined Patent Publication No. H07-313052

SUMMARY OF THE INVENTION

Technical Problem

To reduce the oxygen concentration of the air in the container to a desired concentration as described above, the oxygen concentration of the air in the container needs to be measured, which is why, in general, an oxygen sensor is provided in the container. Sensors deteriorate with time, and the values measured may deviate from actual values. If the value measured by the oxygen sensor deviates from the actual value, the oxygen concentration of the air in the container cannot be controlled to the desired concentration, which may cause damage to the fruits, vegetables, etc., in the container. To avoid this, the oxygen sensor needs to be calibrated periodically. In known techniques, the container is opened to fill the interior with outside air, and the oxygen sensor is calibrated using the outside air.

However, the container cannot keep open under circumstances in which the oxygen concentration of the air in the container is controlled during transportation of fruits, vegetables, etc. Thus, in the known calibration techniques, it is only before the transportation of the fruits, vegetables, etc., that the oxygen sensor can be calibrated. Moreover, a certain period of time is required so that the air in the container is completely replaced with the outside air after the opening of the container. In other words, preparation for the calibration of the oxygen sensor takes time, and the calibration process time cannot be shortened.

In view of the foregoing background, it is therefore an object of the invention to provide a container refrigeration apparatus which controls a temperature and composition of the air in a container to be in a desired state, wherein an oxygen sensor for measuring the oxygen concentration of the air in the container can be calibrated in a short time at any timing.

Solution to the Problem

A first aspect of the invention is directed to a container refrigeration apparatus attached to a container (11) in which a breathing plant (15) is housed. The container refrigeration apparatus includes: a refrigerant circuit (20) to which an evaporator (24) that allows air in the container (11) to exchange heat with a refrigerant is connected, and in which the refrigerant circulates to perform a refrigeration cycle; and an inside air control system (60) which has: a gas supply device (30) having a supply passage (44) which communicates with an inside of the container (11) and through which supply air is supplied into the container (11); and an oxygen sensor (51) which measures an oxygen concentration of the air in the container (11), the inside air control system (60) controlling the oxygen concentration of the air in the container (11) to be a target concentration. A supply state of the gas supply device (30) is switched between a first supply state of producing, from outside air, nitrogen-enriched air having a higher nitrogen concentration and lower oxygen concentration than the outside air, and supplying, as the supply air, the nitrogen-enriched air into the container (11), and a second supply state in which the gas supply device (30) takes outside air therein and supplies, as the supply air, the outside air into the container (11). The inside air control system (60) has a branch pipe (81) which is connected to the supply passage (44) and guides at least part of the supply air flowing through the supply passage (44) to the oxygen sensor (51), and an open/close valve (82) which opens/closes the branch pipe (81). The inside air control system (60) performs an outside air calibration operation in which the open/close valve (82) is opened in the second supply state, and the at least part of the outside air flowing through the supply passage (44) is guided to the oxygen sensor (51) to calibrate the oxygen sensor (51) using the outside air.

In the first aspect, a refrigeration cycle is performed in the refrigerant circuit (20), thereby cooling the air in the container (11). In the inside air control system (60), when the gas supply device (30) is switched to the first supply state, the nitrogen-enriched air is supplied into the container (11) as supply air. When the gas supply device (30) is switched to the second supply state, the outside air is supplied into the container (11) as supply air. In this manner, the inside air control system (60) controls the oxygen concentration of the air in the container (11) to a target concentration by supplying the nitrogen-enriched air and the outside air into the container (11), using the gas supply device (30).

Further, in the first aspect, an outside air calibration operation is performed in which the open/close valve (82) provided at the branch pipe (81) is opened in the second supply state to guide at least part of the outside air flowing through the supply passage (44) to the oxygen sensor (51) through the branch pipe (81), and in which the oxygen sensor (51) is calibrated using this outside air.

A second aspect of the invention is an embodiment of the first aspect. In the second aspect, the container refrigeration apparatus includes: a fan (26) which forms a flow of air that passes through the evaporator (24) and circulates in the container (11); and an air passage (58) having one end open on a blowout side of the fan (26) and the other end open on a suction side of the fan (26). The oxygen sensor (51) is provided at the air passage (58) so as to measure an oxygen concentration of air flowing through the air passage (58). The branch pipe (81) is connected to the air passage (58) to allow the supply air flowing through the branch pipe (81) to flow into the air passage (58). The inside air control system (60) performs the outside air calibration operation while the fan (26) stops rotating.

In the second aspect, the air in the container (11) flows from one end to the other end of the air passage (58) provided in the container while the fan (26) is rotating. Thus, while the fan (26) is rotating, the oxygen concentration of the air in the container is measured by the oxygen sensor (51) provided at the air passage (58). On the other hand, the air in the container does not flow into the air passage (58) while the fan (26) stops rotating. The inside air control system (60) performs the outside air calibration operation while the fan (26) stops rotating, in which no air flows from the container into the air passage (58). In the outside air calibration operation, at least part of the outside air taken in by the gas supply device (30) is guided to the air passage (58) through the branch pipe (81). Since no air flows from the container through the air passage (58), the outside air which has flowed into the air passage (58) from the branch pipe (81) flows therethrough and is guided to the oxygen sensor (51). The oxygen sensor (51) is calibrated using this outside air.

A third aspect of the invention is an embodiment of the second aspect. In the third aspect, the air passage (58) is provided with a carbon dioxide sensor (52) which measures a carbon dioxide concentration of the air flowing through the air passage (58), and the inside air control system (60) is configured to calibrate the oxygen sensor (51) and the carbon dioxide sensor (52) in the outside air calibration operation, using the outside air which has flowed into the air passage (58) through the branch pipe (81).

In the third aspect, the air in the container flows from one end to the other end of the air passage (58) provided in the container while the fan (26) is rotating. The oxygen concentration and the carbon dioxide concentration of the air in the container are measured by the oxygen sensor (51) and the carbon dioxide sensor (52), respectively, which are provided at the air passage (58). On the other hand, if the inside air control system (60) performs the outside air calibration operation while the fan (26) stops rotating, in which no air flows from the container into the air passage (58), at least part of the outside air taken by the gas supply device (30) is guided to the air passage (58) through the branch pipe (81). Since no air flows from the container through the air passage (58), the outside air which has flowed into the air passage (58) from the branch pipe (81) flows therethrough and is guided to the oxygen sensor (51) and the carbon dioxide sensor (52). The oxygen sensor (51) and the carbon dioxide sensor (52) are calibrated using this outside air.

A fourth aspect of the invention is an embodiment of the third aspect. In the fourth aspect, the inside air control system (60) performs a supply air measurement operation in which, while the fan (26) stops rotating, the open/close valve (82) is opened in the first supply state, and at least part of the nitrogen-enriched air flowing through the supply passage (44) is guided to the oxygen sensor (51), and an oxygen concentration of the nitrogen-enriched air is measured by the oxygen sensor (51).

In the fourth aspect, a supply air measurement operation is performed in which, while the fan (26) stops rotating, the open/close valve (82) provided at the branch pipe (81) is opened in the first supply state, and at least part of the nitrogen-enriched air flowing through the supply passage (44) is guided to the oxygen sensor (51), and the oxygen concentration of this nitrogen-enriched air is measured by the oxygen sensor (51).

A fifth aspect of the invention is an embodiment of the fourth aspect. In the fifth aspect, in the supply air measurement operation, the inside air control system (60) measures the oxygen concentration of the nitrogen-enriched air which has flowed into the air passage (58) through the branch pipe (81) by the oxygen sensor (51), and calibrates the carbon dioxide sensor (52) using the nitrogen-enriched air.

In the fifth aspect, when the inside air control system (60) performs the supply air measurement operation while the fan (26) stops rotating, part of the nitrogen-enriched air produced by the gas supply device (30) is guided to the air passage (58) through the branch pipe (81). Since no air flows from the container through the air passage (58), the nitrogen-enriched air which has flowed into the air passage (58) from the branch pipe (81) flows therethrough and is guided to the oxygen sensor (51) and the carbon dioxide sensor (52). The oxygen concentration of the nitrogen-enriched air is measured by the oxygen sensor (51). The carbon dioxide sensor (52) is calibrated using the nitrogen-enriched air. The nitrogen-enriched air is produced from the outside air in the gas supply device (30). Thus, the carbon dioxide concentration of the nitrogen-enriched air is almost the same as the carbon dioxide concentration of the outside air. The carbon dioxide sensor (52) may thus be calibrated using the nitrogen-enriched air.

A sixth aspect of the invention is an embodiment of any one of the first to fifth aspects. In the sixth aspect, the gas supply device (30) has a first pump mechanism (31*a*) which sucks, compresses, and discharges outside air, a second pump mechanism (31*b*) which sucks, compresses, and discharges air, a first adsorption portion (34) and a second adsorption portion (35) each having an adsorbent which adsorbs nitrogen in air, the first and second adsorption portions (34) and (35) being alternately connected to an outlet of the first pump mechanism (31*a*) and an inlet of the second pump mechanism (31*b*), the first and second adsorption portion, when connected to the outlet of the first pump mechanism (31*a*) and supplied with the compressed outside air, allowing the nitrogen in the outside air to be adsorbed onto the adsorbent and thereby producing oxygen-enriched air, and when connected to the inlet of the second pump mechanism (31*b*) which sucks the air inside, allowing the nitrogen adsorbed onto the adsorbent to be desorbed from the adsorbent and thereby producing nitrogen-enriched air, the supply passage (44) which is connected to an outlet of the second pump mechanism (31*b*) and guides the air discharged from the second pump mechanism (31*b*) into the container (11) as the supply air, a bypass passage (71) which guides the outside air discharged from the first pump mechanism (31*a*) to the second pump mechanism (31*b*) while bypassing the first and second adsorption portions (34) and (35), and a bypass passage open/close valve (72) which opens/closes the bypass passage (71). When the bypass open/close valve (72) is closed, the gas supply device (30) is switched to the first supply state. When the bypass open/close valve (72) is open, the gas supply device (30) is switched to the second supply state.

In the sixth aspect, the outside air compressed by the first pump mechanism (31a) is alternately supplied to the first and second adsorption portions (34) and (35), where the nitrogen in the outside air is adsorbed onto the adsorbent, thereby producing oxygen-enriched air. On the other hand, the second pump mechanism (31b) alternately sucks the air from the first and second adsorption columns (34) and (35) to desorb the nitrogen adsorbed onto the adsorbent, thereby producing nitrogen-enriched air. When the bypass open/close valve (72) is closed, the gas supply device (30) is switched to the first supply state, and the nitrogen-enriched air produced in the first and second adsorption portions (34) and (35) is forced into the container (11) through the supply passage (44). On the other hand, when the bypass open/close valve (72) is open, the gas supply device (30) is switched to the second supply state, and the outside air compressed by and discharged from the first pump mechanism (31a) passes through the bypass passage (71), and is sucked into the second pump mechanism (31b), in which the outside air is compressed and discharged into the supply passage (44) and forced into the container (11). That is, the supply state may be easily switched between the first supply state of supplying the nitrogen-enriched air into the container (11) via the supply passage (44) and the second supply state of supplying the outside air into the container (11) via the supply passage (44), by simply opening and closing the bypass open/close valve (72).

Advantages of the Invention

According to the first aspect, the supply state of the gas supply device (30) is switched between the first supply state supplying, as supply air, the nitrogen-enriched air into the container (11), and the second supply state in which the gas supply device (30) supplies, as supply air, the outside air into the container (11). In the gas supply device (30), the branch pipe (81) is connected to the supply passage (44) through which the supply air flows, so that at least part of the supply air is guided to the oxygen sensor (51). The branch pipe (81) is provided with the open/close valve (82) which opens and closes the branch pipe (81). In this configuration, at least part of the outside air flowing through the supply passage (44) can be guided to the oxygen sensor (51) by simply opening the open/close valve (82) in the second supply state. The oxygen sensor (51) can be calibrated using this outside air. Since the oxygen sensor (51) is calibrated using the at least part of the outside air supplied into the container (11), the oxygen sensor (51) may be calibrated at any timing. Further, since the outside air is guided to the oxygen sensor (51) through the branch pipe (81), it is not necessary, unlike the known techniques, to wait for the air in the container (11) to be replaced with the outside air. This allows the calibration to be performed promptly at any timing.

According to the second aspect, the branch pipe (81) connected to the supply passage (44) is connected to the air passage (58) which is provided with the oxygen sensor (51) and through which the air in the container flows from its one end to the other end during the rotation of the fan (26) so that the oxygen sensor (51) can measure the oxygen concentration of the air in the container. Due to this configuration, the outside air calibration operation may be performed by opening the open/close valve (82) of the branch pipe (81) while the rotation of the fan (26) is stopped (i.e., while the air in the container does not flow through the air passage (58)) without providing another passage for guiding the supply air to the oxygen sensor (51).

The plants (15) release carbon dioxide through breathing. If the carbon dioxide concentration of the air in the container (11) increases too much through the breathing, the plants (15) in the container may discolor. The carbon dioxide concentration of the air in the container therefore also needs to be monitored in order to keep the plants (15) in the container (11) fresh.

Thus, according to the third aspect, the carbon dioxide sensor (52) is provided at the air passage (58) where the oxygen sensor (51) is provided. In this configuration, when the air in the container (11) is guided into the air passage (58) by the rotation of the fan (26) to measure the oxygen concentration of the air in the container (11), the air in the container (11) is guided to the carbon dioxide sensor (52), as well. That is, this configuration does not require the provision of another configuration guiding the air in the container to the carbon dioxide sensor (52), and allows the air in the container to be guided to the carbon dioxide sensor (52) through the air passage (58) used to guide the air in the container to the oxygen sensor (51), thereby making it possible to measure the carbon dioxide concentration of the air in the container.

According to the third aspect, the carbon dioxide sensor (52) is provided at the air passage (58) where the oxygen sensor (51) is provided. Thus, when the outside air is guided into the air passage (58) through the branch pipe (81) to calibrate the oxygen sensor (51) using the outside air, the outside air is guided to the carbon dioxide sensor (52), as well. That is, this configuration does not require the provision of another configuration guiding the outside air to the carbon dioxide sensor (52), and allows the outside air to be guided to the carbon dioxide sensor (52) through the branch pipe (81) and the air passage (58) used to guide the outside air to the oxygen sensor (51), thereby making it possible to calibrate the carbon dioxide sensor (52) using the outside air.

According to the fourth aspect, part of the nitrogen-enriched air flowing through the supply passage (44) can be guided to the oxygen sensor (51) by simply opening the open/close valve (82) in the first supply state. The oxygen concentration of the nitrogen-enriched air can thus be measured by the oxygen sensor (51). Since at least part of the nitrogen-enriched air is guided to the oxygen sensor (51) during the operation of supplying the nitrogen-enriched air into the container (11), the performance of the gas supply device (30) (that is, whether the gas supply device (30) is producing nitrogen-enriched air with a desired nitrogen concentration or not) may be checked at any timing without a nitrogen sensor. As a result, in the case where the air in the container (11) cannot be controlled to have a desired oxygen concentration, it may be easily determined whether such an uncontrollable situation is caused by a malfunction of the gas supply device (30) or by poor airtightness of the container (11).

According to the fifth aspect, the carbon dioxide sensor (52) is provided at the air passage (58) where the oxygen sensor (51) is provided. Thus, when the nitrogen-enriched air is guided into the air passage (58) through the branch pipe (81) to allow the oxygen sensor (51) to measure the oxygen concentration of the nitrogen-enriched air, the nitrogen-enriched air is guided to the carbon dioxide sensor (52), as well. The carbon dioxide concentration of the nitrogen-enriched air produced from the outside air is equal to the carbon dioxide concentration of the outside air. Thus, the carbon dioxide sensor (52) can be calibrated using the nitrogen-enriched air in a similar manner to the case in which the carbon dioxide sensor (52) is calibrated using the outside air. That is, this configuration does not require the provision of another configuration guiding the nitrogen-enriched air to the carbon dioxide sensor (52), and allows the nitrogen-enriched air to be guided to the carbon dioxide sensor (52) through the branch pipe (81) and the air passage (58) used to guide the outside air to the oxygen sensor (51), thereby making it possible to calibrate the carbon dioxide sensor (52) using the nitrogen-enriched air.

According to the sixth aspect, the supply state may be easily switched between the first supply state of supplying the nitrogen-enriched air into the container (11) via the supply passage (44) and the second supply state of supplying the outside air into the container (11) via the supply passage (44), by simply opening and closing the bypass open/close valve (72).

DESCRIPTION OF EMBODIMENTS

Embodiments of the present invention will now be described in detail with reference to the drawings. Note that the following description of embodiments is merely examples in nature, and is not intended to limit the scope, application, or uses of the present invention.

«First Embodiment of The Invention»

Figure 1:
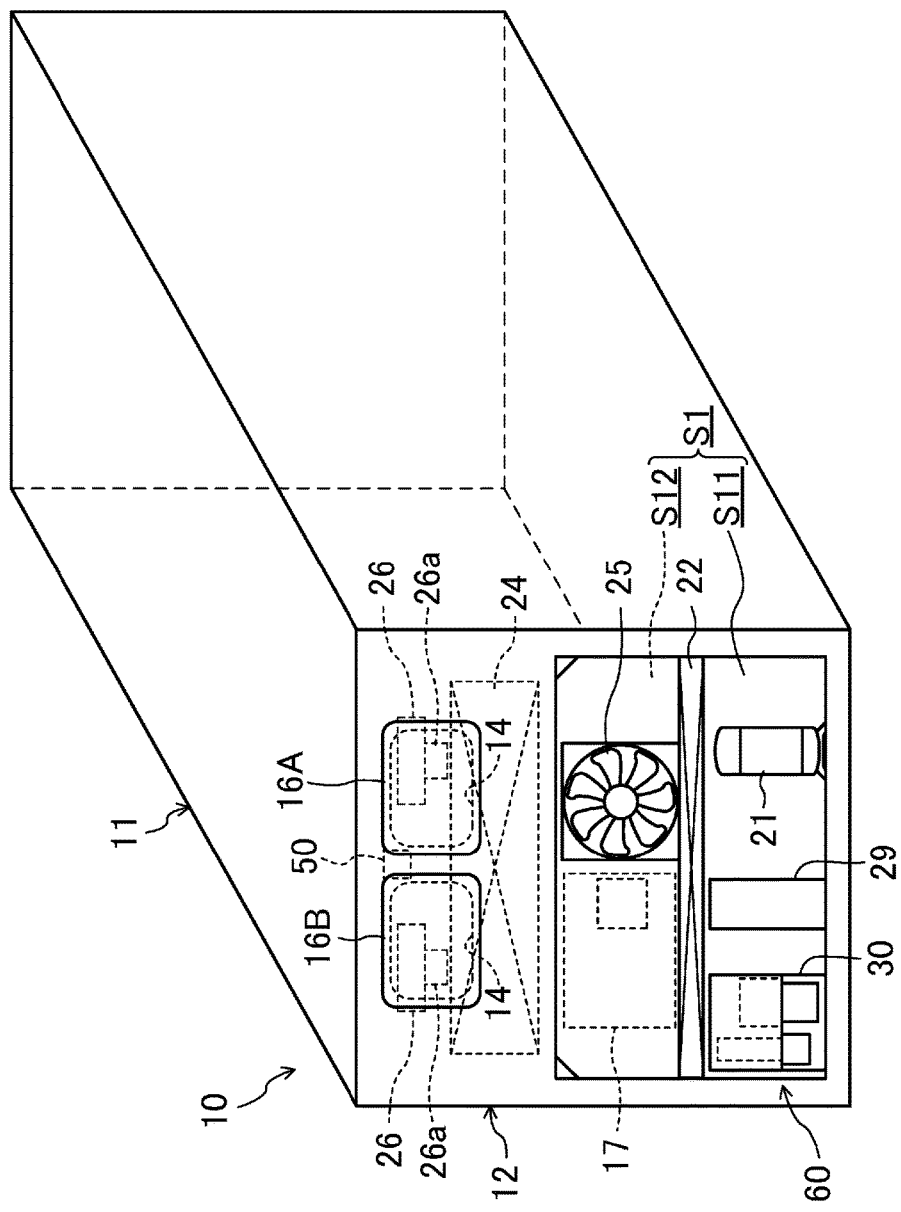
FIG. 1 is a perspective view illustrating a container refrigeration apparatus of a first embodiment as viewed from outside.
Figure 2:
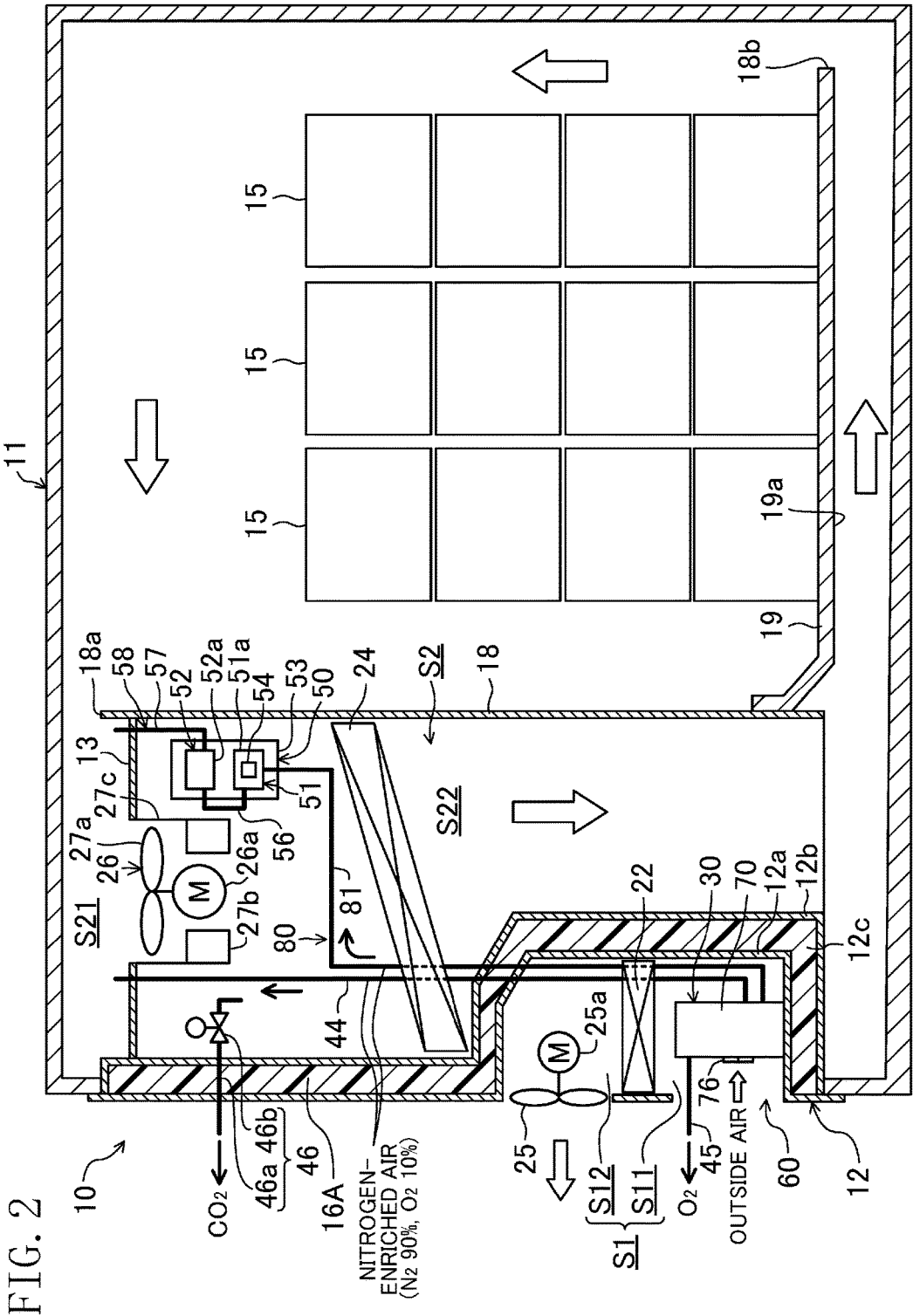
FIG. 2 is a cross-sectional view illustrating a general configuration of the container refrigeration apparatus of the first embodiment.

As shown in FIGS. 1 and 2, a container refrigeration apparatus (10) is provided for a container (11) for use in, e.g., marine transportation, and cools the air in the container (11). Boxed plants (15) are stored in the container (11). The plants (15) breathes by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere system (CA system) (60), and is attached to close an open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of aluminum alloy, for example.

The exterior wall (12a) is attached to the periphery of the opening of the container (11) so as to close the open end of the container (11). The exterior wall (12a) is formed such that the lower part of the exterior wall (12a) protrudes into the container (11).

The interior wall (12b) is disposed to face the exterior wall (12a). The interior wall (12b) protrudes into the container (11) just like the lower part of the exterior wall (12a). A thermal insulator (12c) fills the space between the interior and exterior walls (12b, 12a).

As can be seen, the lower part of the casing (12) is formed so as to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the interior of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) partitions the internal storage space (S2) vertically such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the container (11) is provided at an end of the floorboard (19) opposite from the open end of the container (11) (on the right side in FIG. 2).

<Refrigerant Circuit>

Figure 3:
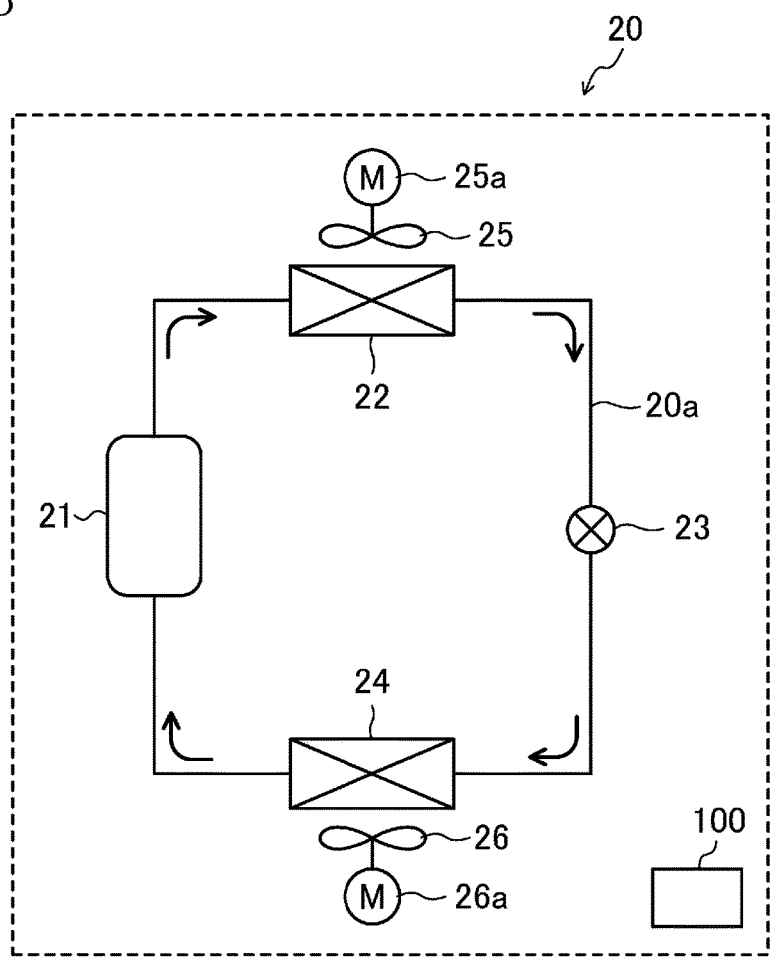
FIG. 3 is a piping diagram illustrating a configuration of a refrigerant circuit in the container refrigeration apparatus of the first embodiment.

As shown in FIG. 3, the refrigerant circuit (20) is a closed circuit in which a compressor (21), a condenser (22), an expansion valve (23), and an evaporator (24) are connected together in this order by refrigerant piping (20a).

An external fan (25) is disposed near the condenser (22). The external fan (25) is driven in rotation by an external fan motor (25a), guides the air in the exterior space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent from the external fan (25) to the condenser (22). In this embodiment, the external fan (25) is comprised of a propeller fan.

Two internal fans (26) are disposed near the evaporator (24). The internal fans (26) are driven in rotation by internal fan motors (26a), and draw the air in the container (11) through a suction port (18a) and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electrical component box (17) are disposed in the second space (S12). The first space (S11) is open toward the exterior space of the container (11). A plate member is arranged to close the second space (S12) from the exterior space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
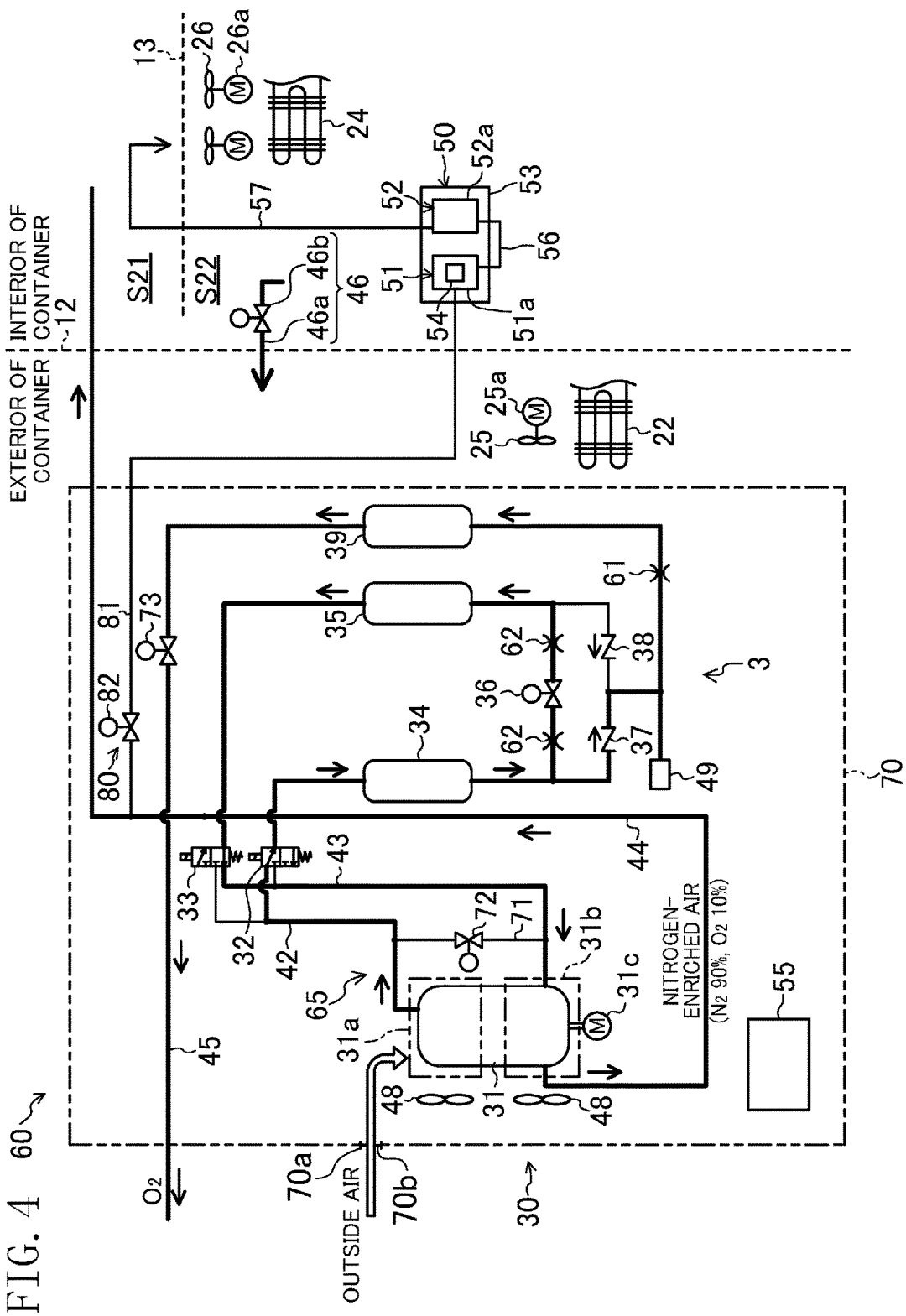
FIG. 4 is a piping diagram illustrating the configuration of a CA system in the container refrigeration apparatus of the first embodiment, together with the flow of air during a first flow state.

As shown in FIG. 4, the CA system (60) includes a gas supply device (30), an exhaust portion (46), a sensor unit (50), a measurement unit (80), and a controller (55), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) produces nitrogen-enriched air with a low oxygen concentration to be supplied into the container (11). In this embodiment, the gas supply device (30) is comprised of a vacuum pressure swing adsorption (VPSA)-type device. Further, the gas supply device (30) is disposed at the lower left corner of the external storage space (S1), as shown in FIG. 1.

As shown in FIG. 4, the gas supply device (30) includes an air circuit (3) connecting an air pump (31), first and second directional control valves (32) and (33), first and second adsorption columns (34) and (35) each provided with an adsorbent for adsorbing nitrogen in the air, and an oxygen tank (39), and a unit case (70) housing these components of the air circuit (3). In this manner, the gas supply device (30) forms a single unit with these components housed in the unit case (70), and is configured to be retrofitted to the container refrigeration apparatus (10).

(Air Pump)

The air pump (31) is provided in the unit case (70), and includes first and second pump mechanisms (31a) and (31b), each of which sucks and compresses the air and discharges the compressed air. The first and second pump mechanisms (31a) and (31b) are connected to a driving shaft of a motor (31c), and are driven in rotation by the motor (31c) to suck and compress the air, and discharge the compressed air.

An inlet of the first pump mechanism (31a) opens in the unit case (70), and an air-permeable, waterproof membrane filter (70b) is provided for an air inlet (70a) of the unit case. Thus, the first pump mechanism (31a) sucks and compresses the outside air from which moisture has been removed when flowing from the outside to inside of the unit case (70) through the membrane filter (70b) provided for the air inlet (70a). On the other hand, an outlet of the first pump mechanism (31a) is connected to one end of a discharge passage (42). The other end (downstream end) of the discharge passage (42) is divided into two branches, which are connected to the first directional control valve (32) and the second directional control valve (33), respectively.

An inlet of the second pump mechanism (31b) is connected to one end of a suction passage (43). The other end (upstream end) of the suction passage (43) is divided into two branches, which are connected to the first and second directional control valves (32) and (33), respectively. On the other hand, an outlet of the second pump mechanism (31b) is connected to one end of a supply passage (44). The other end of the supply passage (44) opens in the first space (S21) on the suction side of the internal fans (26) in the internal storage space (S2) of the container (11).

The first and second pump mechanisms (31a) and (31b) of the air pump (31) are configured as oil-free pumps without lubricant oil. Specifically, suppose that oil is used in the pump of the first pump mechanism (31a). In such a situation, when the first and second adsorption columns (34) and (35) are pressurized by being supplied with the compressed air, the oil included in the compressed air is adsorbed onto the adsorbent, resulting in a decreased adsorption performance of the adsorbent.

On the other hand, if oil is used in the pump of the second pump mechanism (31b), the oil is supplied to the interior of the container (11) together with the nitrogen-enriched air containing nitrogen desorbed from the first and second adsorption columns (34) and (35).

That is to say, in that case, the nitrogen-enriched air with an oily smell is supplied to the interior of the container (11) loaded with plants (15).

Thus, this embodiment is configured to overcome such a disadvantage by implementing the first and second pump mechanisms (31a) and (31b) of the air pump (31) as oil-free pumps.

Two blower fans (48) are disposed on the side of the air pump (31) to cool the air pump (31) by blowing air to the air pump (31).

(Directional Control Valve)

The first and second directional control valves (32) and (33) are provided in the air circuit (3) between the air pump (31) and the first and second adsorption columns (34) and (35), and switches the connection between the air pump (31) and the first and second adsorption columns (34) and (35) among first to third connection states. The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization and an outlet during depressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a). In this embodiment, the first directional control valve (32) is configured as a solenoid valve which, when not energized, is in the first state, and switched to the second state when energized.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization and an outlet during depressurization). This second directional control valve (33) switches between a first state where the second adsorption column (35) is allowed to communicate with the inlet of the second pump mechanism (31b) to be blocked from the outlet of the first pump mechanism (31a) (the state shown in FIG. 4), and a second state where the second adsorption column (35) is allowed to communicate with the outlet of the first pump mechanism (31a) to be blocked from the inlet of the second pump mechanism (31b). In this embodiment, the second directional control valve (33) is configured as a solenoid valve which, when not energized, is in the second state, and switched to the first state when energized.

If the first and second directional control valves (32) and (33) are set to be the first state (i.e., if only the second directional control valve (33) is energized), the air circuit (3) is switched to the first connection state where the outlet of the first pump mechanism (31a) is connected to the first adsorption column (34), and the inlet of the second pump mechanism (31b) is connected to the second adsorption column (35). In this state, an adsorption operation is performed on the first adsorption column (34) to adsorb nitrogen in the outside air onto the adsorbent, and a desorption operation is performed on the second adsorption column (35) to desorb nitrogen adsorbed onto the adsorbent.

If the first and second directional control valves (32) and (33) are set to be the second state (i.e., if only the first directional control valve (32) is energized), the air circuit (3) is switched to the second connection state where the outlet of the first pump mechanism (31a) is connected to the second adsorption column (35), and the inlet of the second pump mechanism (31b) is connected to the first adsorption column (34). In this state, the adsorption operation is performed on the second adsorption column (35), and the desorption operation is performed on the first adsorption column (34).

If the first directional control valve (32) is set to be the first state, and the second directional control valve (33) is set to be the second state (i.e., if both of the first and second directional control valves (32) and (33) are not energized), the air circuit (3) is switched to the third connection state where the outlet of the first pump mechanism (31a) is connected to the first adsorption column (34), and the outlet of the first pump mechanism (31a) is connected to the second adsorption column (35). In this state, both of the first and second adsorption columns (34) and (35) are connected to the outlet of the first pump mechanism (31a), which supplies compressed outside air to both of the first and second adsorption columns (34) and (35). In other words, in the third connection state, both of the first and second adsorption columns (34) and (35) are pressurized by the first pump mechanism (31a) (i.e., turn to a dual pressurization state). In this state, an adsorption operation is performed in both of the first and second adsorption columns (34) and (35).

(Adsorption Column)

The first and second adsorption columns (34) and (35) are configured as cylindrical members filled with an adsorbent, and are disposed upright (i.e., disposed such that each axis direction thereof is a vertical direction). The adsorbent that fills the first and second adsorption columns (34) and (35) absorbs nitrogen in a state where the adsorption columns (34, 35) are pressurized, and desorbs nitrogen in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. Nitrogen in the air may be absorbed by using zeolite having pores of such a diameter as the adsorbent.

Cations exist in the pores of zeolite, and thus an electric field has been generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with nitrogen as a result of the desorption operation. Consequently, nitrogen-enriched air including moisture is supplied to the interior of the container (11), thus increasing the humidity in the container (11). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), nitrogen in the outside air is adsorbed onto the adsorbent. This produces oxygen-enriched air that has had its nitrogen concentration lowered and oxygen concentration increased by including less nitrogen than the outside air does. On the other hand, if the air pump (31) sucks the air from the first and second adsorption columns (34) and (35) to depressurize these columns (34) and (35), the nitrogen adsorbed onto the adsorbent is desorbed. This produces nitrogen-enriched air that has had its nitrogen concentration increased and oxygen concentration lowered by including more nitrogen than the outside air does. In this embodiment, this nitrogen-enriched air may be 90% nitrogen and 10% oxygen, for example.

The respective lower ends of the first and second adsorption columns (34) and (35) (functioning as outlets during pressurization and inlets during depressurization) are connected to one end of an oxygen exhaust passage (45) through which the oxygen-enriched air that has been produced in the first and second adsorption columns (34) and (35) from the compressed outside air supplied by the first pump mechanism (31a) is guided toward the outside of the container (11). The one end of the oxygen exhaust passage (45) is divided into two branches, which are connected to the lower ends of the first and second adsorption columns (34) and (35), respectively. The other end of the oxygen exhaust passage (45) opens outside the gas supply device (30), i.e., outside the container (11). One of the two branches of the one end of the oxygen exhaust passage (45), i.e., the one connected to the lower end of the first adsorption column (34), is provided with a first check valve (37) which prevents backflow of the air from the oxygen exhaust passage (45) to the first adsorption column (34). The other branch of the oxygen exhaust passage (45) connected to the lower end of the second adsorption column (35) is provided with a second check valve (38) which prevents backflow of the air from the oxygen exhaust passage (45) to the second adsorption column (35).

The two branches of the one end of the oxygen exhaust passage (45) are connected with each other via a purge valve (36), and an orifice (62) is provided between the purge valve (36) and each of the branches. The purge valve (36) is used to introduce a predetermined amount of the oxygen-enriched air into an adsorption column being depressurized (the second adsorption column (35) in FIG. 4) from an adsorption column being pressurized (the first adsorption column (34) in FIG. 4) to support the release of nitrogen from the adsorbent of the adsorption columns (35, 34) being depressurized. The controller (55) controls an opening/closing operation of the purge valve (36).

The oxygen tank (39) is provided at some midpoint of the oxygen exhaust passage (45), and an orifice (61) is provided between the oxygen tank (39) and the first and second check valves (37) and (38). The oxygen tank (39) temporarily retains the oxygen-enriched air produced in the first and second adsorption columns (34) and (35). The oxygen-enriched air produced in the first and second adsorption columns (34) and (35) is depressurized by the orifice (61), and is then temporarily retained in the oxygen tank (39).

A pressure sensor (49) which measures the pressure of the compressed air supplied to the first and second adsorption columns (34) and (35) by the first pump mechanism (31a) is connected between the orifice (61) of the oxygen exhaust passage (45) and the first and second check valves (37) and (38).

(Flow Switching Mechanism)

The air circuit (3) further includes a flow switching mechanism (65) which switches the state of flow of the air in the air circuit (3) between a first flow state where the nitrogen-enriched air produced in the first and second adsorption columns (34) and (35) is supplied into the container (11) by the air pump (31), and a second flow state where the outdoor air taken into the air circuit (3) is supplied into the container (11) by the air pump (31).

In this embodiment, the flow switching mechanism (65) includes a bypass passage (71), a bypass open/close valve (72), and an exhaust passage open/close valve (73). The bypass passage (71) connects the discharge passage (42) and the suction passage (43). The bypass open/close valve (72) is provided in the bypass passage (71). The exhaust passage open/close valve (73) is provided in the oxygen exhaust passage (45) so as to be closer to the exterior of the gas supply device (30) than the oxygen tank (39), i.e., provided outside the container (11).

The controller (55) controls an opening/closing operation of the bypass open/close valve (72) and the exhaust passage open/close valve (73). Although particular behaviors will be described later, the flow state of the air in the air circuit (3) is switched to the first flow state (the state shown in FIG. 4) by closing the bypass open/close valve (72) and opening exhaust passage open/close valve (73) by the controller (55). On the other hand, the flow state of the air in the air circuit (3) is switched to the second flow state (the state shown in FIG. 5) by opening the bypass open/close valve (72) and closing the exhaust passage open/close valve (73) by the controller (55).

In this embodiment, by switching the flow state of the air in the air circuit (3) to the first flow state (the state shown in FIG. 4), the gas supply device (30) turns to a first supply state supplying, as supply air, the nitrogen-enriched air produced in the first and second adsorption column (34) and (35) from the outside air, into the container (11) through the supply passage (44). On the other hand, by switching the flow state of the air in the air circuit (3) to the second flow state (the state shown in FIG. 5), the gas supply device (30) turns to a second supply state in which the gas supply device (30) takes outside air therein, and supplies, as supply air, the outside air into the container (11) through the supply passage (44).

—Operation Mechanism of Gas Supply Device—

The supply states of the gas supply device (30) are switched between the first supply state supplying, as supply air, the nitrogen-enriched air produced from the outside air into the container (11), and the second supply state in which the gas supply device (30) takes outside air therein and supplies, as supply air, the outside air into the container (11).

«Operation in First Supply State»

The controller (55) switches the flow state of the air in the air circuit (3) to the first flow state, thereby switching the supply state of the gas supply device (30) to the first supply state.

Specifically, the controller (55) operates the air pump (31) with the bypass open/close valve (72) closed and the exhaust passage open/close valve (73) open. The controller (55) controls the first and second directional control valves (32) and (33) such that the connection state between the air pump (31) and the first and second adsorption columns (34) and (35) is switched alternately between the first connection state and the second connection state at predetermined intervals (e.g., every fifteen seconds). In the first connection state, a first operation is performed in which the first adsorption column (34) is pressurized, whereas the second adsorption column (35) is depressurized. On the other hand, in the second connection state, a second operation is performed in which the first adsorption column (34) is depressurized, whereas the second adsorption column (35) is pressurized.

«First Operation»

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). Nitrogen contained in the air which has flowed into the first adsorption column (34) is adsorbed on the adsorbent of the first adsorption column (34). Thus, during the first operation, the compressed outside air is supplied from the first pump mechanism (31a) to the first adsorption column (34), in which the adsorbent adsorbs nitrogen in the outside air, thereby producing the oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31b) sucks the air from the second adsorption column (35). Simultaneously, the second pump mechanism (31b) also sucks nitrogen adsorbed onto the adsorbent in the second adsorption column (35) together with the air, thereby allowing the adsorbent to desorb nitrogen. Thus, during the first operation, the second pump mechanism (31b) sucks the air out of the second adsorption column (35) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Second Operation»

During the second operation, the controller (55) switches the first and second directional control valves (32) and (33) to the second state opposite from the state shown in FIG. 4. Thus, the air circuit (3) is set to the second connection state where the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). Nitrogen contained in the air flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs nitrogen in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks nitrogen adsorbed onto the adsorbent in the first adsorption column (34) together with the air, thereby allowing the adsorbent to desorb nitrogen. Thus, during the second operation, the second pump mechanism (31b) sucks the air out of the first adsorption column (34) to allow the adsorbent to desorb nitrogen adsorbed thereon. This produces nitrogen-enriched air containing the nitrogen desorbed from the adsorbent, and having a higher nitrogen concentration and a lower oxygen concentration than the outside air. The nitrogen-enriched air is sucked into the second pump mechanism (31b), compressed, and discharged toward the supply passage (44).

In this manner, the gas supply device (30) alternately repeats the first and second operations to produce the nitrogen-enriched air and the oxygen-enriched air in the air circuit (3). Further, in the first flow state, the bypass open/close valve (72) is closed and the exhaust passage open/close valve (73) is open. Thus, oxygen-enriched air produced in the first and second adsorption columns (34) and (35) is exhausted out of the container (11) via the oxygen exhaust passage (45) by the pressure applied by the first pump mechanism (31a) of the air pump (31), while the nitrogen-enriched air produced in the first and second adsorption columns (34) and (35) is supplied into the container (11) via the supply passage (44) by the pressure applied by the second pump mechanism (31b) of the air pump (31).

In this manner, in the first flow state, a gas supply operation is performed in which the nitrogen-enriched air produced in the first and second adsorption columns (34) and (35) is supplied into the container (11). That is, the gas supply device (30) is set to the first supply state supplying, as supply air, the nitrogen-enriched air produced from the outside air into the container (11) via the supply passage (44).

«Operation in Second Supply State»

The controller (55) switches the flow state of the air in the air circuit (3) to the second flow state, thereby switching the supply state of the gas supply device (30) to the second supply state.

Specifically, the controller (55) controls the first and second directional control valves (32) and (33) with the bypass open/close valve (72) open and the exhaust passage open/close valve (73) closed, thereby switching the connection state between the air pump (31) and the first and second adsorption columns (34) and (35) to the third connection state (i.e., the dual pressurization state) in which both of the first and second adsorption columns (34) and (35) are connected to the outlet of the first pump mechanism (31a). Then, the air pump (31) is operated.

In the second flow state, the compressed outside air is supplied to both of the first and second adsorption columns (34) and (35) by the first pump mechanism (31a). An adsorption operation is performed in both of the first and second adsorption columns (34) and (35) to produce oxygen-enriched air.

In the second flow state, the bypass open/close valve (72) is open, and the exhaust passage open/close valve (73) is closed. Thus, even if the compressed outside air is supplied to the first and second adsorption columns (34) and (35), and the oxygen-enriched air is produced, the oxygen-enriched air will not be exhausted outside (i.e., to the outside of the container (11)). Thus, soon after the flow state is switched to the second flow state, the internal pressure significantly increases between the junction of the discharge passage (42) with the bypass passage (71) and the exhaust passage open/close valve (73) of the oxygen exhaust passage (45). As a result, the outside air compressed by the first pump mechanism (31a) does not flow toward the first and second adsorption columns (34) and (35).

Thus, the outside air compressed by the first pump mechanism (31a) flows into the bypass passage (71) from the discharge passage (42), bypasses the first and second adsorption columns (34) and (35), flows into the suction passage (43), and is sucked into the second pump mechanism (31b). That is, the outside air compressed by the first pump mechanism (31a) is sucked directly into the second pump mechanism (31b). The outside air which has been sucked into the second pump mechanism (31b) is compressed and supplied into the container via the supply passage (44).

In this manner, in the second flow state, an outside air introduction operation is performed in which the outside air which has been taken into the air circuit (3) is directly supplied into the container (11) by the pressure applied by the second pump mechanism (31b) of the air pump (31). That is, the gas supply device (30) is set to the second supply state supplying, as supply air, the outside air taken therein into the container (11) via the supply passage (44).

[Exhaust Portion]

As shown in FIG. 2, the exhaust portion (46) includes an exhaust passage (46a) connecting the internal storage space (S2) and the exterior space of the container, and an exhaust valve (46b) connected to the exhaust passage (46a). The exhaust passage (46a) passes through the casing (12) from the interior to exterior of the casing (12). The exhaust valve (46b) is provided adjacent to an internal end of the exhaust passage (46a), and is comprised of a solenoid valve which is switched between an open state where the air is allowed to flow through the exhaust passage (46a), and a closed state where the air is prevented from flowing through the exhaust tube (46a). The controller (55) controls an opening/closing operation of the exhaust valve (46b).

When the external fan (25) is rotating, an exhaust operation is performed in which the controller (55) opens the exhaust valve (46b) to exhaust the air (inside air) in the internal storage space (S2) communicating with the interior of the container out of the container.

Specifically, when the external fan (25) is rotating, the pressure of the second space (S22) on the blowout side becomes higher than the pressure of the exterior space of the container (i.e., the atmospheric pressure). Thus, when the exhaust valve (46b) is open, due to the pressure difference between the ends of the exhaust passage (46a) (the pressure difference between the external space of the container and the secondary space (S22), the air in the internal storage space (S2) communicating with the interior of the container (inside air) is exhausted out of the container via the exhaust passage (46a).

[Sensor Unit]

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic cell-type sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54), which is air-permeable and waterproof, is attached. Further, a branch pipe (81) of a measurement unit (80), which will be described later, is coupled via a connector (pipe joint) to a lower surface of the oxygen sensor box (51a). In addition, one end of the connection pipe (56) is coupled via a connector to one of the side surfaces of the oxygen sensor box (51a).

The carbon dioxide sensor (52) has a carbon dioxide sensor box (52a). The carbon dioxide sensor (52) is a non-dispersive infrared sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). Furthermore, one end of the exhaust pipe (57) is coupled via a connector to the other side surface of the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

As can be seen, the secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57).

Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor

(52) are connected. Thus, the air sequentially flows from the interior of the container to the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Measurement Unit]

The measurement unit (80) includes a branch pipe (81) and a measurement on-off valve (82), and is configured to diverge, and guide to the oxygen sensor (51), part of nitrogen-enriched air produced in the gas supply device (30) and passing through the supply passage (44).

Specifically, the branch pipe (81) has one end connected to the supply passage (44), and the other end coupled to the oxygen sensor box (51a) of the oxygen sensor (51). According to this configuration, the branch pipe (81) allows the supply passage (44) to communicate with the internal space of the oxygen sensor box (51a). In this embodiment, the branch pipe (81) is branched from the supply passage (44) in the unit case (70) and extends from the interior to exterior of the unit case (70).

The measurement on-off valve (82) is provided for the branch pipe (81) in the unit case. The measurement on-off valve (82) is comprised of a solenoid valve switching between an open state where the flow of nitrogen-enriched air in the branch pipe (81) is allowed, and a closed state where the flow of the nitrogen-enriched air in the branch pipe (81) is blocked. The controller (55) controls an opening/closing operation of the measurement on-off valve (82). As will be described in detail later, the measurement on-off valve (82) is open only when a supply air measurement operation to be described later is performed, and is closed in the other modes.

[Controller]

Figure 6:
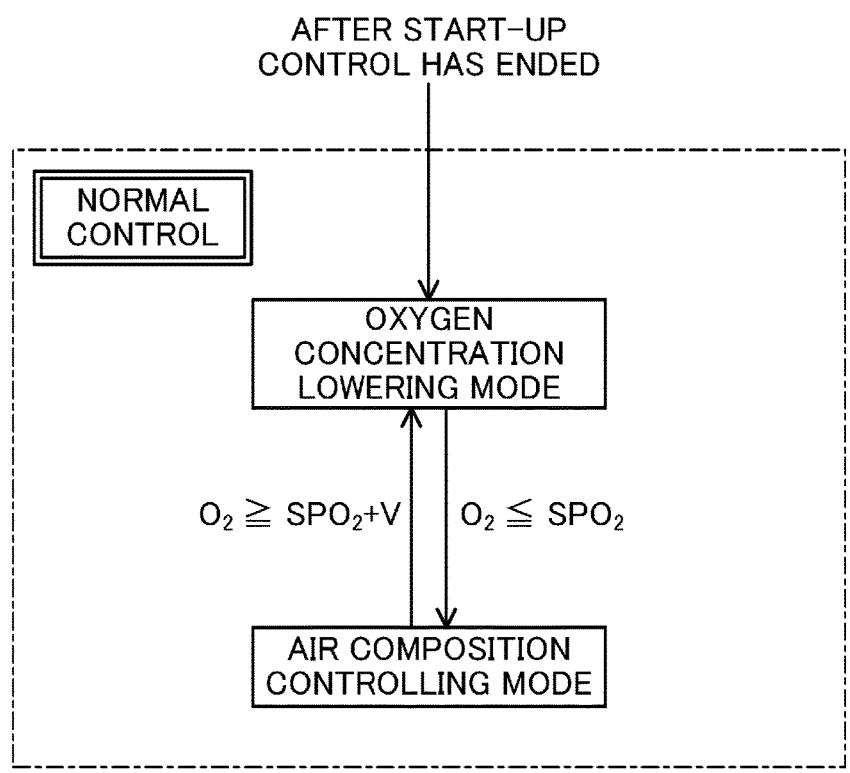
FIG. 6 illustrates how the mode is changed during normal control according to the first embodiment.

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 5% oxygen and 5% carbon dioxide). As shown in FIG. 6, in this embodiment, the controller (55) is configured to perform start-up control and normal control to carry out the concentration control operation. Further, the controller (55) is configured to perform the normal control after the predetermined start-up control has ended, and to perform control in an oxygen concentration lowering mode or an air composition controlling mode during the normal control.

In addition, the controller (55) is configured to control the operation of the measurement on-off valve (82) in accordance with a command entered by a user or periodically so as to perform a supply air measurement operation of measuring the oxygen concentration of the nitrogen-enriched air produced by the gas supply device (30).

Further, the controller (55) is configured to control the operation of the measurement on-off valve (82) in accordance with a command entered by a user or periodically so as to perform an outside air calibration operation of calibrating the oxygen sensor (51) and the carbon dioxide sensor (52), using at least part of the outside air taken into the gas supply device (30).

—Operation—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the container (11) via the blowout port (18b). Thus, the air in the container (11) is cooled.

<Concentration Control Operation>

In this embodiment, the controller (55) shown in FIG. 4 instructs the CA system (60) to perform a concentration control operation of controlling the composition of the air in the container (11) (oxygen concentration and carbon dioxide concentration) to a desired composition (e.g., 5% oxygen and 5% carbon dioxide) based on the measurement results obtained by the oxygen sensor (51) and the carbon dioxide sensor (52). The controller (55) performs the concentration control operation by executing start-up control and normal control. During the normal control, the controller (55) performs the control in an oxygen concentration lowering mode or an air composition controlling mode so as to control the oxygen concentration and carbon dioxide concentration of the air in the container (11) to desired target concentrations SP, respectively.

During the concentration control operation, the controller (55) instructs the measurement on-off valve (82) to close. Further, during the concentration control operation, the controller (55) communicates with the unit controller (100) to instruct the unit controller (100) to rotate the internal fans (26). Thus, the air in the container is supplied to the oxygen sensor (51) and the carbon dioxide sensor (52) by the internal fans (26), and then the oxygen concentration and carbon dioxide concentration of the air in the container are measured.

Specifically, as shown in FIG. 6, the controller (55) performs the control in the oxygen concentration lowering mode during the normal control after the start-up control has ended. Then, if the oxygen concentration of the air in the container (11) measured by the oxygen sensor (51) is lowered to a target oxygen concentration $SPO_2$ (5% in this embodiment), the controller (55) finishes the control in the oxygen concentration lowering mode and starts the control in the air composition controlling mode. In the air composition controlling mode, if the oxygen concentration of the air in the container (11) measured by the oxygen sensor (51) reaches or exceeds a certain concentration (6.0% in this embodiment), which is the sum of the target oxygen concentration $SPO_2$ (5% in this embodiment) and a predetermined concentration V (1.0% in this embodiment), the controller (55) finishes the control in the air composition controlling mode and returns to the oxygen concentration lowering mode. The oxygen concentration lowering mode and air composition controlling mode under the normal control will be described in detail below.

[Oxygen Concentration Lowering Mode]

In the oxygen concentration lowering mode, first, the controller (55) switches the air circuit (3) to the first flow state, and performs a gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air.

Figure 7:
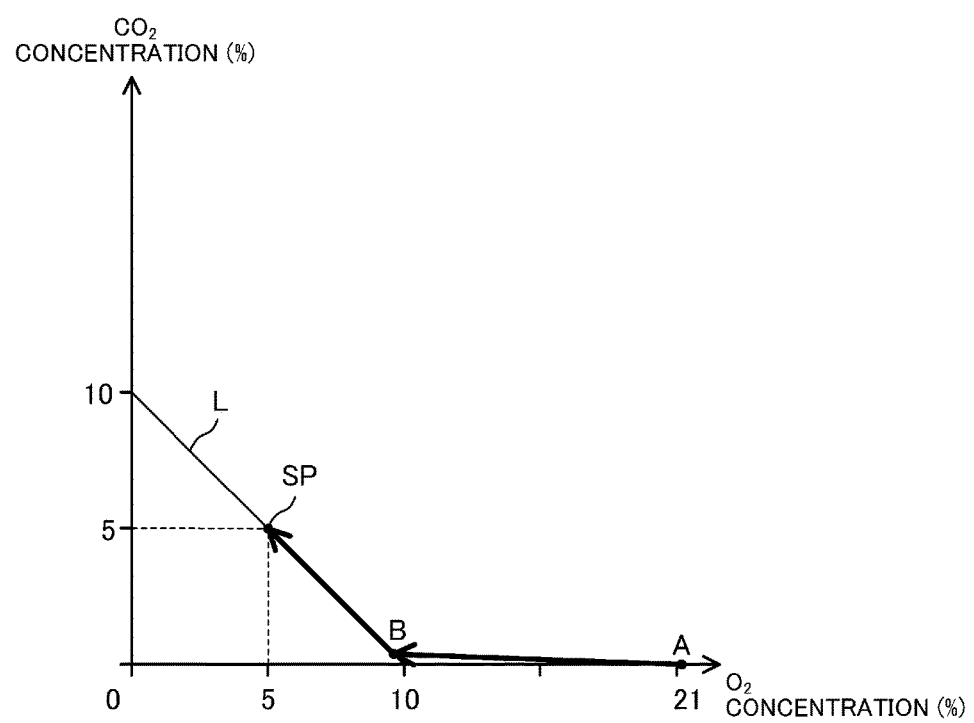
FIG. 7 is a graph illustrating how the composition of the air in a container changes during a concentration control operation in the container refrigeration apparatus of the first embodiment.

Thus, the oxygen concentration of the air in the container is lowered (from point A to point B in FIG. 7).

When the sum of the oxygen concentration and carbon dioxide concentration of the air in the container (11) reaches the sum of the target concentrations, i.e., the sum of the target oxygen concentration $SPO_2$ and the target carbon dioxide concentration $SPCO_2$ (reaches the point B in FIG. 7), the controller (55) stops the gas supply operation and the exhaust operation.

When the gas supply operation and the exhaust operation are stopped, the air in the container (11) is no longer replaced. Therefore, the composition of the air in the container changes only due to the breathing of the plants (15). Through the breathing, the plants (15) take oxygen in, and release the same volume of carbon dioxide as the oxygen taken in. Thus, as the plants (15) respire, the oxygen concentration of the air in the container (11) decreases, and the carbon dioxide concentration increases by the amount of decrease of the oxygen concentration, with the sum of the oxygen concentration and carbon dioxide concentration of the air in the container remaining unchanged. Thus, after the gas supply operation and the exhaust operation have been stopped, the composition of the air in the container (11) changes, as a result of the breathing of the plants (15), along the straight line L having an inclination of −1 and passing the target composition point SP (where the oxygen concentration is 5% and the carbon dioxide concentration is 5%) in a direction in which the oxygen concentration decreases and the carbon dioxide concentration increases. That is, after the gas supply operation and the exhaust operation have been stopped at an arbitrary point on the straight line L, the composition of the air in the container (11) may be controlled to the target composition only by making use of the breathing of the plants (15).

Thereafter, when the oxygen concentration of the air in the container decreases to the target oxygen concentration $SPO_2$ (5% in this embodiment) or lower, the controller (55) finishes the control in the oxygen concentration lowering mode, and starts the control in the air composition controlling mode.

[Air Composition Controlling Mode]

«Control of Oxygen Concentration»

In the air composition controlling mode, the controller (55) performs oxygen concentration increasing control of increasing the oxygen concentration of the air in the container if the oxygen concentration of the air in the container falls below a lower limit value (4.5% in this embodiment), which is lower than the target oxygen concentration $SPO_2$ (5% in this embodiment) only by the predetermined concentration X (0.5% in this embodiment).

In the oxygen concentration increasing control, the controller (55) switches the air circuit (3) to the second flow state, and performs an outside air introduction operation of supplying the outside air taken in the air circuit (3) to the interior of the container (11). Simultaneously, the controller (55) instructs the exhaust valve (46b) of the exhaust portion (46) to open to perform the exhaust operation, so that the air in the container is exhausted out of the container only by the amount of the outside air supplied to the interior of the container (11) during the outside air introduction operation. Through the outside air introduction operation and exhaust operation thus performed, the air in the container is replaced with the outside air, and thus, the oxygen concentration of the air in the container (11) increases.

If the oxygen concentration of the air in the container reaches or exceeds a certain value (5.5% in this embodiment) which is higher than the target oxygen concentration $SPO_2$ (5% in this embodiment) only by the predetermined concentration X (0.5% in this embodiment), the controller (55) stops the outside air introduction operation and the exhaust operation. Thus, the oxygen concentration increasing control ends.

«Control of Carbon Oxide Concentration»

Further, in the air composition controlling mode, the controller (55) performs carbon dioxide concentration lowering control to lower the carbon dioxide concentration of the air in the container if the carbon dioxide concentration of the air in the container reaches or exceeds an upper limit value (5.5% in this embodiment), which is higher than the target carbon dioxide concentration $SPCO_2$ (5% in this embodiment) only by the predetermined concentration Y (0.5% in this embodiment).

During the carbon dioxide concentration lowering control, the controller (55) first switches the air circuit (3) to the first flow state, and then performs the gas supply operation of producing nitrogen-enriched air (consisting of 90% nitrogen and 10% oxygen) in the air circuit (3) and supplying the nitrogen-enriched air to the interior of the container (11). Simultaneously, the controller (55) instructs the exhaust valve (46b) of the exhaust portion (46) to open to perform an exhaust operation, so that the air in the container (11) is exhausted to the exterior of the container only by the amount of the nitrogen-enriched air supplied to the interior of the container (11) during the gas supply operation. Through the gas supply operation and exhaust operation thus performed, the air in the container is replaced with the nitrogen-enriched air. Thus, the carbon dioxide concentration of the air in the container (11) is lowered.

If the carbon dioxide concentration of the air in the container falls below a certain value (4.5% in this embodiment) which is lower than the target carbon dioxide concentration $SPCO_2$ (5% in this embodiment) only by the predetermined concentration Y (0.5% in this embodiment), the controller (55) stops the gas supply operation and the exhaust operation, and ends the carbon dioxide concentration lowering control.

Note that, in the carbon dioxide concentration lowering control, the gas supply operation may be replaced with the outside air introduction operation of supplying the outside air taken into the air circuit (3) to the interior of the container (11), with the air circuit (3) being switched to the second flow state.

[Supply Air Measurement Operation]

Further, the controller (55) performs a supply air measurement operation of measuring the oxygen concentration of the nitrogen-enriched air produced in the gas supply device (30) in accordance with a command entered by a user or periodically (e.g., every ten days). Note that the supply air measurement operation is perfoiined concurrently when the internal fans (26) are stopped during a gas supply operation for the concentration control operation described above or test run.

Specifically, the controller (55) instructs the measurement on-off valve (82) to open during the gas supply operation, that is, while the gas supply device (30) is in the first supply state in which the nitrogen-enriched air produced from the outside air in the first and second adsorption columns (34) and (35) is supplied into the controller (11). When the measurement on-off valve (82) is opened during the gas supply operation, part of the nitrogen-enriched air passing through the supply passage (44) flows into the branch pipe (81). The nitrogen-enriched air that has flowed into the branch pipe (81) flows into the oxygen sensor box (51a) which forms part of the air passage (58). The oxygen sensor (51) then measures the oxygen concentration of the nitrogen-enriched air.

If the oxygen concentration of the nitrogen-enriched air produced in the gas supply device (30) is measured in this way, it may be determined whether or not the composition of the nitrogen-enriched air produced in the gas supply device (30) (oxygen concentration and nitrogen concentration) is in a desired state (consisting of 90% nitrogen and 10% oxygen, for example).

Note that the nitrogen-enriched air which has passed through the oxygen sensor (51) in the air passage (58) passes through the carbon dioxide sensor (52). Thus, the carbon dioxide concentration of the nitrogen-enriched air may be measured by the carbon dioxide sensor (52) in the supply air measurement operation to calibrate the carbon dioxide sensor (52). The nitrogen-enriched air is produced by replacing part of oxygen in the outside air (having a carbon dioxide concentration of 0.03%) with nitrogen. Thus, the carbon dioxide concentration of the nitrogen-enriched air is almost the same as that of the outside air. The carbon dioxide sensor (52) can thus be calibrated by correcting the settings such that the carbon dioxide concentration of the nitrogen-enriched air measured by the carbon dioxide sensor (52) will be 0.03%.

<Outside Air Calibration Operation>

Further, the controller (55) performs an outside air calibration operation in which the oxygen sensor (51) and the carbon dioxide sensor (52) are calibrated using the outside air in accordance with a command entered by a user or periodically (e.g., every ten days). Note that the outside air calibration operation is performed concurrently when the internal fans (26) are stopped during the outside air introduction operation for the concentration control operation described above or test run.

Figure 8:
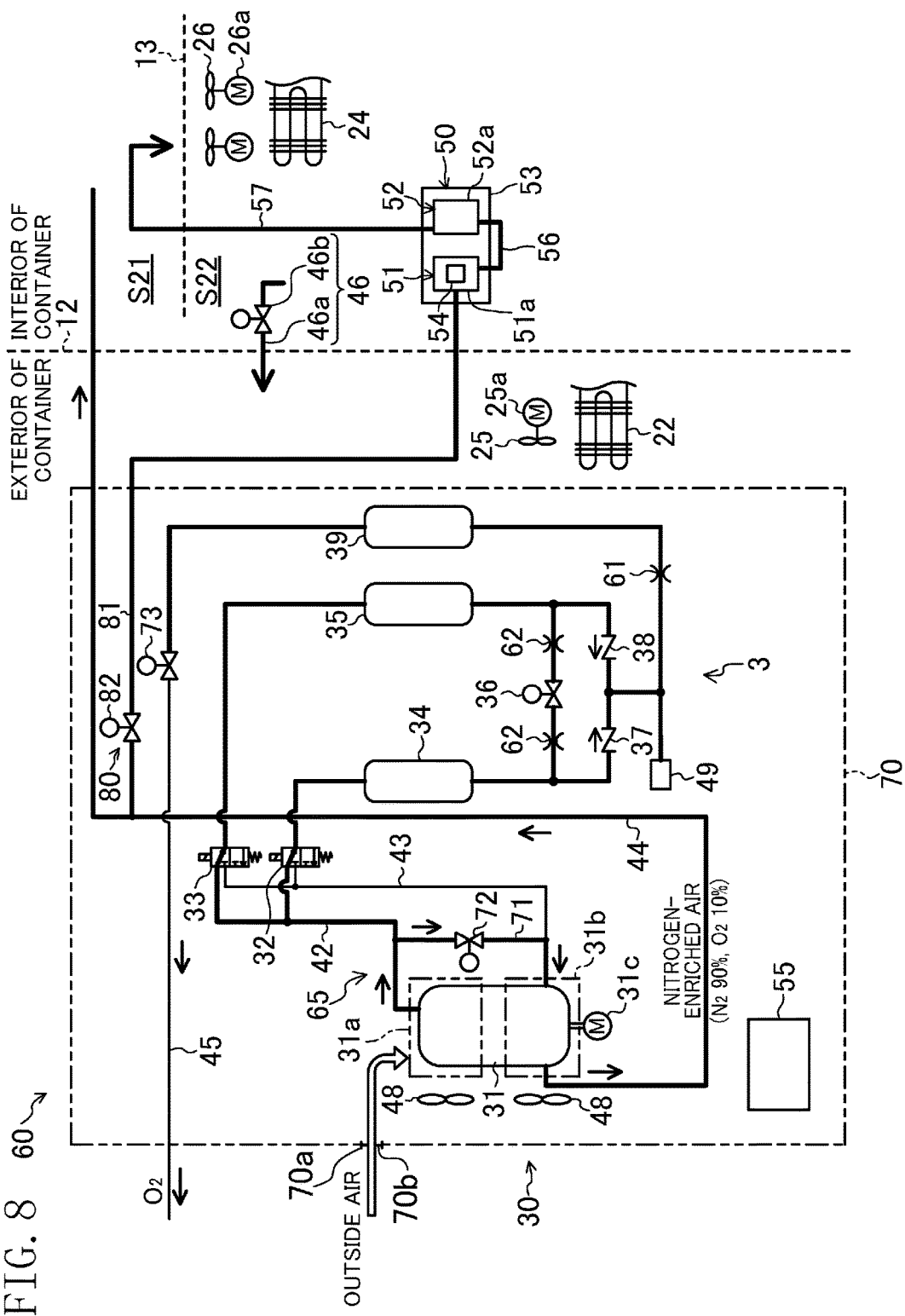
FIG. 8 is a piping diagram illustrating the configuration of the CA system in the container refrigeration apparatus of the first embodiment, together with the flow of air during an outside air calibration operation.

Specifically, the controller (55) instructs the measurement on-off valve (82) to open during the outside air introduction operation, that is, while the gas supply device (30) is in the second supply state (see FIG. 5) in which the outside air is taken into the gas supply device (30) and is supplied into the container (11) by the pressure applied by the second pump mechanism (31b). When the measurement on-off valve (82) is opened during the outside air introduction operation, the outside air flowing through the supply passage (44) flows into the branch pipe (81) and is guided into the oxygen sensor box (51a) as shown in FIG. 8. The outside air which has flowed into the oxygen sensor box (51a) sequentially passes through the oxygen sensor (51) and the carbon dioxide sensor (52) which are connected to the air passage (58). In the outside air calibration operation, the oxygen sensor (51) and the carbon dioxide sensor (52) are calibrated using this outside air.

Specifically, the oxygen sensor (51) measures the oxygen concentration of the outside air passing therethrough, and the carbon dioxide sensor (52) measures the carbon dioxide concentration of the outside air passing therethrough. The outside air is 20.9% oxygen and 0.03% (nearly equal to 0%) carbon dioxide. Thus, the oxygen sensor (51) is calibrated by correcting the settings such that a value of a voltage converted from a value (measured by the oxygen sensor (51)) of a current flowing through an electrolytic solution of the galvanic cell-type sensor indicates 20.9% oxygen. The carbon dioxide sensor (52) is calibrated by correcting the settings such that a value (measured by the carbon dioxide sensor (52)) of a voltage converted from an absorption amount of infrared rays having a wavelength unique to carbon dioxide indicates 0% carbon dioxide.

Further, the controller (55) may be configured to determine that the function of the oxygen sensor (51) declines to the unusable level (end of life) if the value of the voltage converted from the value of the current measured by the oxygen sensor (51) is smaller than a predetermined allowable lower limit, and give warning through display on a control panel (not shown) where operation modes or other information items are input or through sounds to prompt a user to replace the oxygen sensor (51). Similarly to the the case of the oxygen sensor (51), the controller (55) may also be configured to determine that the function of the carbon dioxide sensor (52) declines to the unusable level (end of life) if the value of the voltage converted from the absorption amount of infrared rays measured by the carbon dioxide sensor (52) is smaller than a predetermined allowable lower limit, and give warning to prompt a user to replace the carbon dioxide sensor (52).

The oxygen sensor (51) may have a malfunctioning sensor circuit if the value of the voltage converted from the value of the current measured by the oxygen sensor (51) exceeds a predetermined allowable upper limit. The controller (55) may thus be configured to determine that the calibration has failed if the value of the voltage converted from the value of the current measured by the oxygen sensor (51) exceeds the predetermined allowable upper limit, and give warning through display on a control panel (not shown) where operation modes or other information items are input or through sounds to prompt a user to replace the oxygen sensor (51). Similarly to the oxygen sensor (51), the carbon dioxide sensor (52) may have a malfunctioning sensor circuit if the value of the voltage converted from the absorption amount of the infrared rays measured by the carbon dioxide sensor (52) exceeds a predetermined allowable upper limit. The controller (55) may thus be configured to determine that the calibration has failed if the value of the voltage converted from the absorption amount measured by the carbon dioxide sensor (52) exceeds the predetermined allowable upper limit, and give warning through display on a control panel (not shown) where operation modes and other information items are input, or through sounds to prompt a user to replace the carbon dioxide sensor (52).

—Advantages of First Embodiment—

As described above, according to the first embodiment, the supply state of the gas supply device (30) is switched between the first supply state of supplying, as supply air, the nitrogen-enriched air into the container (11), and the second supply state of supplying, as supply air, the outside air into the container (11). In the gas supply device (30), the branch pipe (81) is connected to the supply passage (44) through which the supply air flows, so that part of the supply air is diverged and guided to the oxygen sensor (51). The branch pipe (81) is provided with the open/close valve (82) which opens and closes the branch pipe (81). In this configuration, part of the outside air flowing through the supply passage (44) can be guided to the oxygen sensor (51) by simply opening the open/close valve (82) in the second supply state. The oxygen sensor can be calibrated using this outside air. Since the oxygen sensor (51) is calibrated using part of the outside air supplied into the container (11), the oxygen sensor (51) may be calibrated at any timing. Further, since the outside air is guided to the oxygen sensor (51) through the branch pipe (81), it is not necessary, unlike the known techniques, to wait for the air in the container (11) to be replaced with the outside air. This allows the calibration to be performed promptly at any timing.

According to the first embodiment, the branch pipe (81) connected to the supply passage (44) is connected to the air passage (58) which is provided with the oxygen sensor (51) and through which the air in the container flows from its one end to the other end during the rotation of the fan (26) so that the oxygen sensor (51) can measure the oxygen concentration of the air in the container. Due to this configuration, the outside air calibration operation may be performed by opening the open/close valve (82) of the branch pipe (81) while the rotation of the fan (26) is stopped (i.e., while the air in the container does not flow through the air passage (58)) without providing another passage for guiding the supply air to the oxygen sensor (51). The plants (15) release carbon dioxide through breathing. If the carbon dioxide concentration of the air in the container (11) increases too much through the breathing, the plants (15) in the container may discolor. The carbon dioxide concentration of the air in the container therefore also needs to be monitored in order to keep the plants (15) in the container (11) fresh.

Thus, according to the first embodiment, the carbon dioxide sensor (52) is provided at the air passage (58) where the oxygen sensor (51) is provided. In this configuration, when the air in the container (11) is guided into the air passage (58) by the rotation of the fan (26) to measure the oxygen concentration of the air in the container (11), the air in the container (11) is guided to the carbon dioxide sensor (52), as well. That is, this configuration does not require the provision of another configuration guiding the air in the container to the carbon dioxide sensor (52), and allows the air in the container to be guided to the carbon dioxide sensor (52) through the air passage (58) used to guide the air in the container to the oxygen sensor (51), thereby making it possible to measure the carbon dioxide concentration of the air in the container.

According to the first embodiment, the carbon dioxide sensor (52) is provided at the air passage (58) where the oxygen sensor (51) is provided. Thus, when the outside air is guided into the air passage (58) through the branch pipe (81) to calibrate the oxygen sensor (51) using the outside air, the outside air is guided to the carbon dioxide sensor (52), as well. That is, this configuration does not require the provision of another configuration guiding the outside air to the carbon dioxide sensor (52), and allows the outside air to be guided to the carbon dioxide sensor (52) through the branch pipe (81) and the air passage (58) used to guide the outside air to the oxygen sensor (51), thereby making it possible to calibrate the carbon dioxide sensor (52) using the outside air.

According to the first embodiment, part of the nitrogen-enriched air flowing through the supply passage (44) can be guided to the oxygen sensor (51) by simply opening the open/close valve (82) in the first supply state. The oxygen concentration of the nitrogen-enriched air can thus be measured by the oxygen sensor (51). Since part of the nitrogen-enriched air is diverged and guided to the oxygen sensor (51) during the operation of supplying the nitrogen-enriched air into the container (11), the performance of the gas supply device (30) (that is, whether the gas supply device (30) is producing nitrogen-enriched air with a desired nitrogen concentration or not) may be checked at any timing without a nitrogen sensor. As a result, in the case where the air in the container (11) cannot be controlled to have a desired oxygen concentration, it may be easily determined whether such an uncontrollable situation is caused by a malfunction of the gas supply device (30) or by poor airtightness of the container (11).

According to the first embodiment, the carbon dioxide sensor (52) is provided at the air passage (58) where the oxygen sensor (51) is provided. Thus, when the nitrogen-enriched air is guided into the air passage (58) through the branch pipe (81) to allow the oxygen sensor (51) to measure the oxygen concentration of the nitrogen-enriched air, the nitrogen-enriched air is guided to the carbon dioxide sensor (52), as well. The carbon dioxide concentration of the nitrogen-enriched air produced from the outside air is equal to the carbon dioxide concentration of the outside air. Thus, the carbon dioxide sensor (52) can be calibrated using the nitrogen-enriched air in a similar manner to the case in which the carbon dioxide sensor (52) is calibrated using the outside air. That is, this configuration does not require the provision of another configuration guiding the nitrogen-enriched air to the carbon dioxide sensor (52), and allows the nitrogen-enriched air to be guided to the carbon dioxide sensor (52) through the branch pipe (81) and the air passage (58) used to guide the outside air to the oxygen sensor (51), thereby making it possible to calibrate the carbon dioxide sensor (52) using the nitrogen-enriched air.

According to the first embodiment, the supply state may be easily switched between the first supply state of supplying the nitrogen-enriched air into the container (11) via the supply passage (44) and the second supply state of supplying the outside air into the container (11) via the supply passage (44), by simply opening and closing the bypass open/close valve (72).

«Second Embodiment of The Invention»

Figure 9:
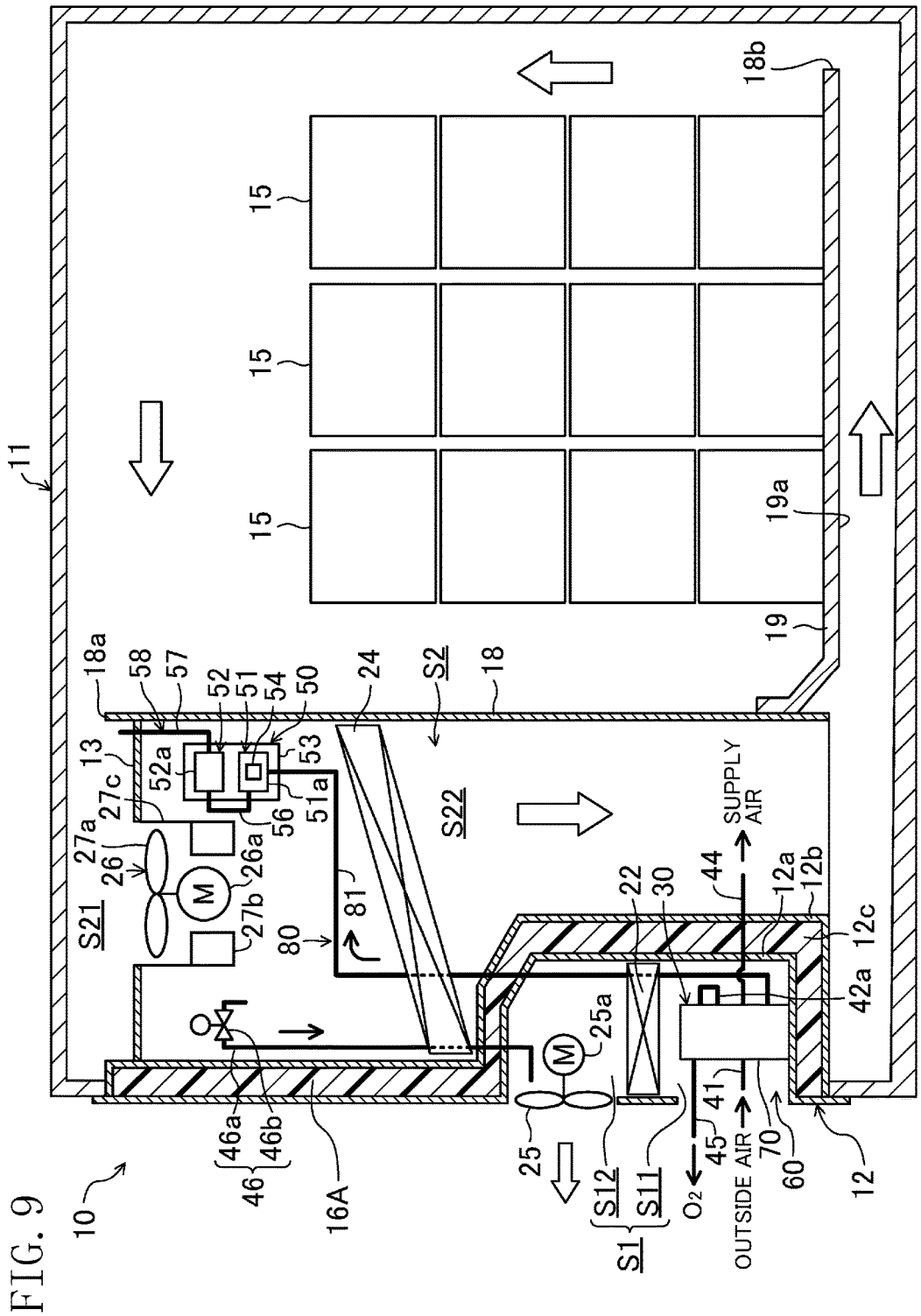
FIG. 9 is a cross-sectional view illustrating a general configuration of a container refrigeration apparatus of a second embodiment.

As illustrated in FIG. 9, the container refrigeration apparatus (10) of a second embodiment includes, just like that of the first embodiment, a casing (12), a refrigerant circuit (20), and a controlled atmosphere system (CA system) (60), and is attached to close an open end of the container (11). The container refrigeration apparatus (10) of the second embodiment differs from that of the first embodiment in the configuration of the CA system (60). Configurations and operation of the CA system which are different from those of the CA system of the first embodiment will be described below. The same reference characters are used to designate the same elements as those in the first embodiment.

<CA System>

As illustrated in FIGS. 10-14, the CA system (60) includes a gas supply device (30) similar to the gas supply device of the first embodiment, an exhaust portion (46), a sensor unit (50) and a controller (55).

[Gas Supply Device]

—Configuration of Gas Supply Device—

As shown in FIGS. 10-14, the gas supply device (30) includes an air circuit (3) connecting an air pump (31), first and second directional control valves (32) and (33), and first and second adsorption columns (34) and (35) each provided with an adsorbent for adsorbing a nitrogen component in the air, and a unit case (70) housing these components of the air circuit (3). Unlike the first embodiment, the air circuit (3) of the second embodiment is not provided with the oxygen tank (39).

(Air Pump)

The air pump (31) is provided in the unit case (70), and includes a first pump mechanism (a pressurizing portion) (31a) and a second pump mechanism (a depressurizing portion) (31b), each of which sucks and compresses the air and discharges compressed air.

The first and second pump mechanisms (31a) and (31b) are connected to a driving shaft of a motor (31c), and are driven in rotation by the motor (31c) to suck and compress the air, and discharge the compressed air.

One end of an outside air passage (41) arranged so as to pass through the unit case (70) from the interior to exterior of the unit case (70) is connected to the inlet of the first pump mechanism (31a). An air-permeable, waterproof membrane filter (77) is provided at the other end of the outside air passage (41). The outside air passage (41) is made of a flexible tube. Although not shown in the drawings, the other end of the outside air passage (41) where the membrane filter (77) is provided is arranged in the second space (S12) of the external storage space (S1) above the condenser (22). Due to this configuration, the first pump mechanism (31a) sucks and compresses the outside air from which moisture has been removed while flowing from the outside to inside of the unit case (70) through the membrane filter (77) provided at the other end of the outside air passage (41).

On the other hand, an outlet of the first pump mechanism (31a) is connected to one end of a discharge passage (42). The other end (downstream end) of the discharge passage (42) is divided into two branches, which are connected to the first directional control valve (32) and the second directional control valve (33), respectively. A large part of the discharge passage (42) is made of a resin tube, and part of the discharge passage (42) is configured as a cooling portion (42a) located outside the unit case (70). In this embodiment, the cooling portion (42a) is connected to some midpoint of the resin tube, and is made of a copper pipe arranged in the external storage space (S1). Due to this configuration, the air compressed by the first pump mechanism (31a) and flowing through the discharge passage (42) dissipates heat to the outside air in the external storage space (S1) where the cooling portion (42a) is disposed, and is cooled, while passing through the cooling portion (42a) made of the copper pipe.

An inlet of the second pump mechanism (31b) is connected to one end of a suction passage (43). The other end (upstream end) of the suction passage (43) is divided into two branches, which are connected to the first and second directional control valves (32) and (33), respectively. On the other hand, an outlet of the second pump mechanism (31b) is connected to one end of a supply passage (44). The other end of the supply passage (44) opens in the second space (S22) on the blowout side of the internal fans (26) in the internal storage space (S2) of the container (11) (see FIG. 9). The supply passage (44) is provided with a check valve (91) at the other end portion thereof. The check valve (91) allows the air to flow only from one end to the other end of the supply passage (44) and prevents backflow of the air.

In the second embodiment, too, the air pump (31) is configured as an oil-free pump. Further, two blower fans (48) are disposed on the side of the air pump (31).

(Directional Control Valve)

The first and second directional control valves (the switching mechanism) (32, 33) have configurations similar to those of the first embodiment, and switch the connection state between the air pump (31) and the first and second adsorption columns (34) and (35) among the following four connection states (i.e., first to fourth connection states).

Figure 10:
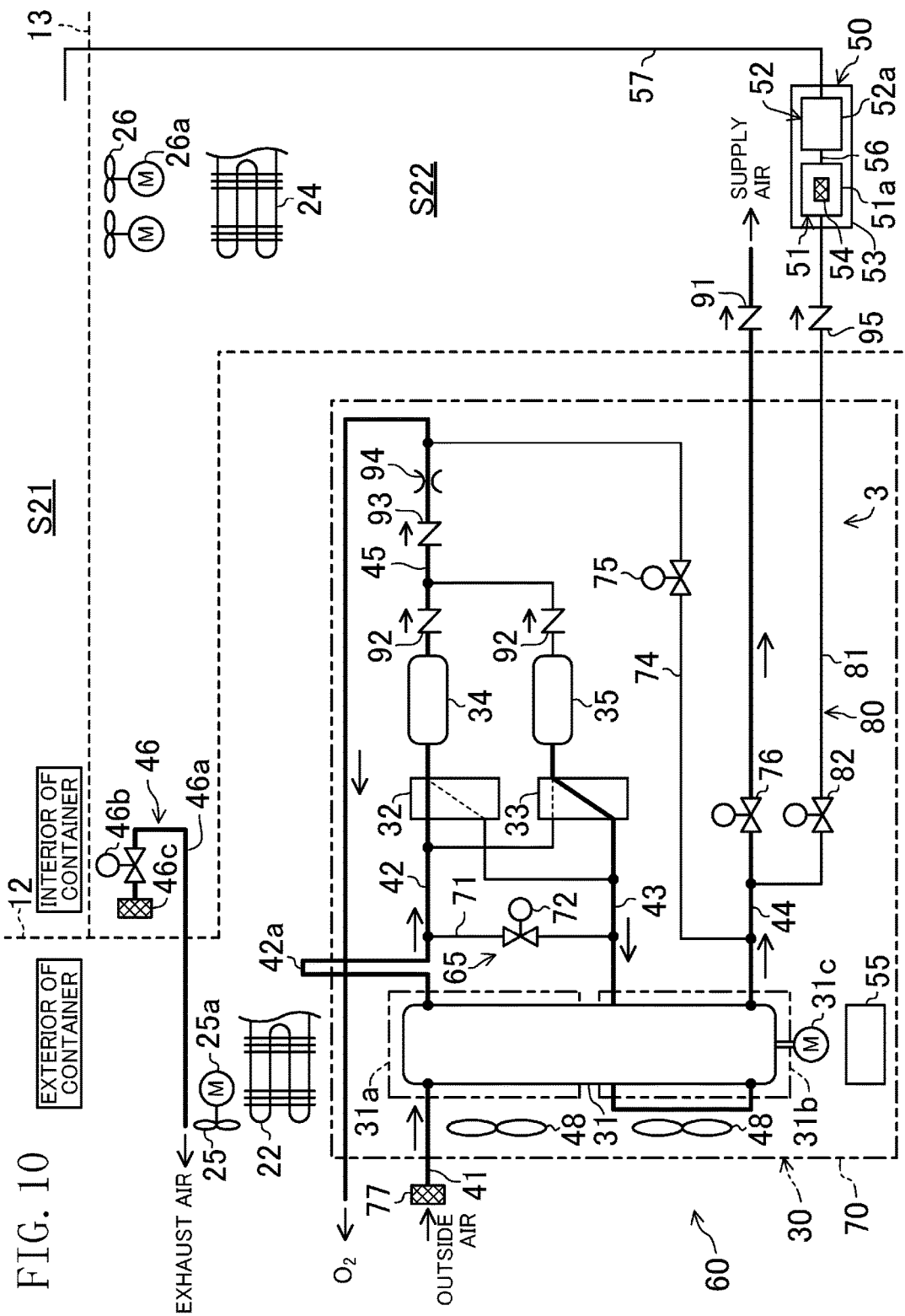
FIG. 10 is a piping diagram illustrating a configuration of a CA system in the container refrigeration apparatus of the second embodiment, together with the flow of air during a first operation in a first flow state.
Figure 11:
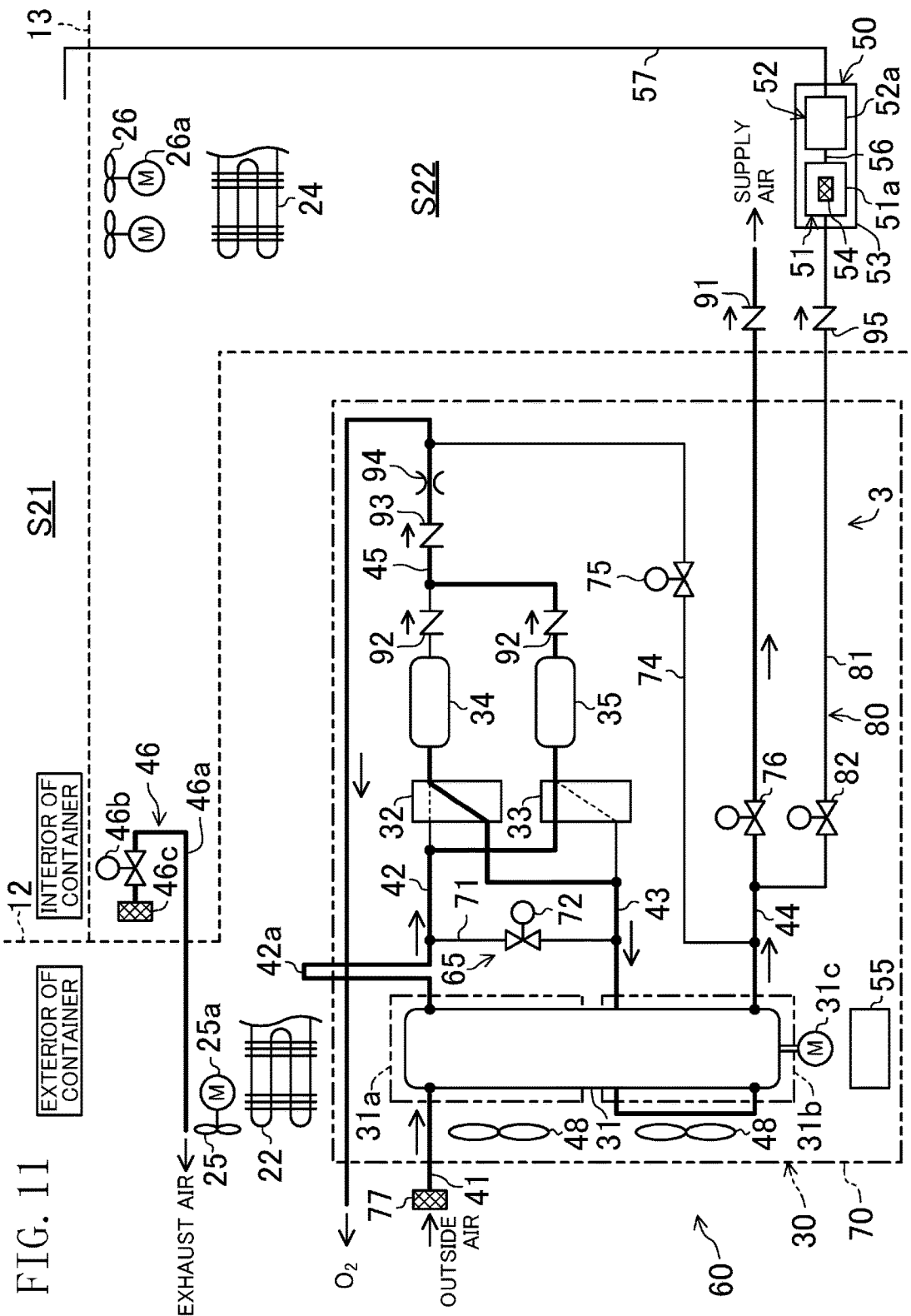
FIG. 11 is a piping diagram illustrating a configuration of the CA system in the container refrigeration apparatus of the second embodiment, together with the flow of air during a second operation in the first flow state.
Figure 12:
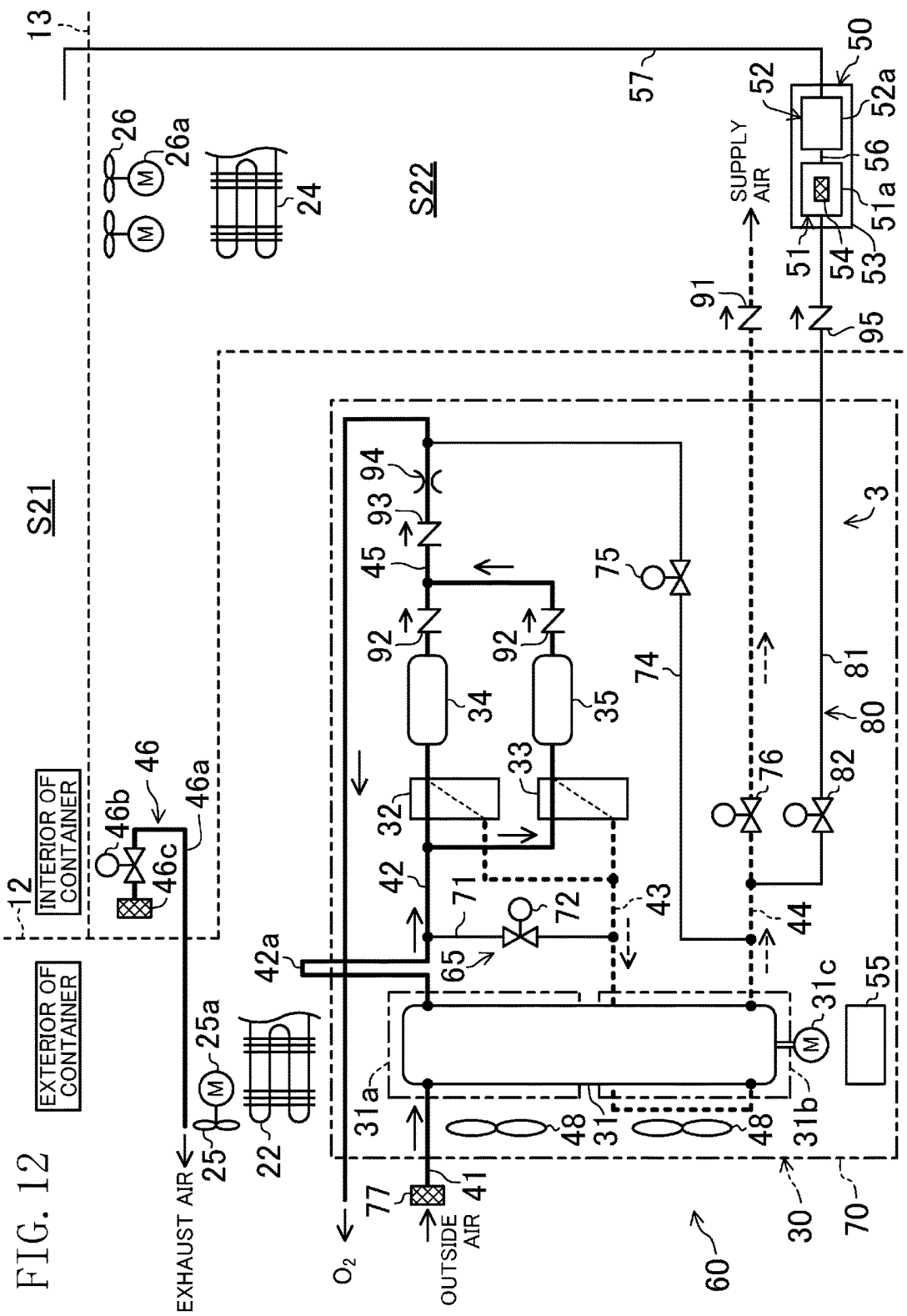
FIG. 12 is a piping diagram illustrating a configuration of the CA system in the container refrigeration apparatus of the second embodiment, together with the flow of air during a pressure equalization operation.
Figure 13:
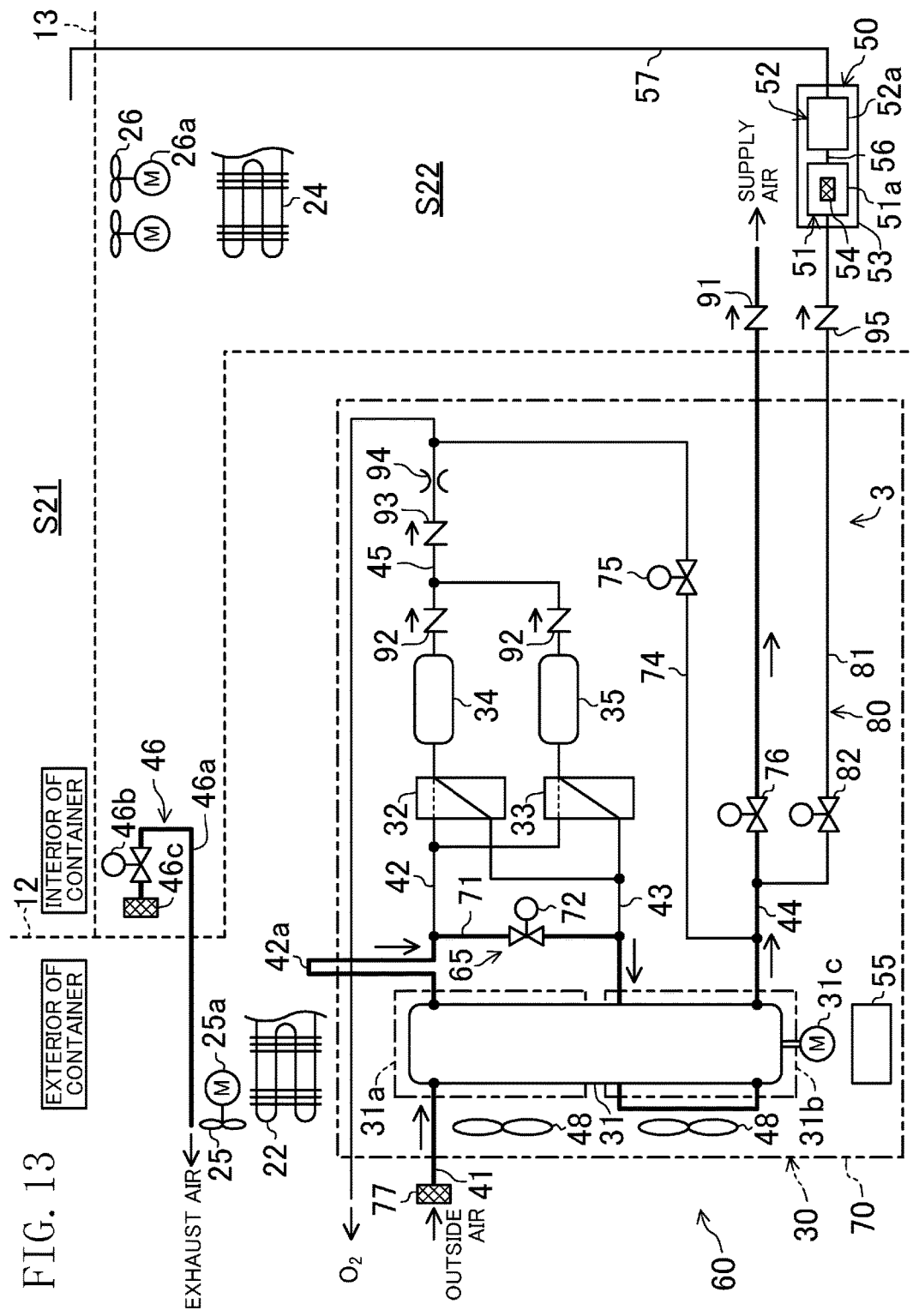
FIG. 13 is a piping diagram illustrating a configuration of the CA system in the container refrigeration apparatus of the second embodiment, together with the flow of air during an outside air introduction operation in a second state.
Figure 14:
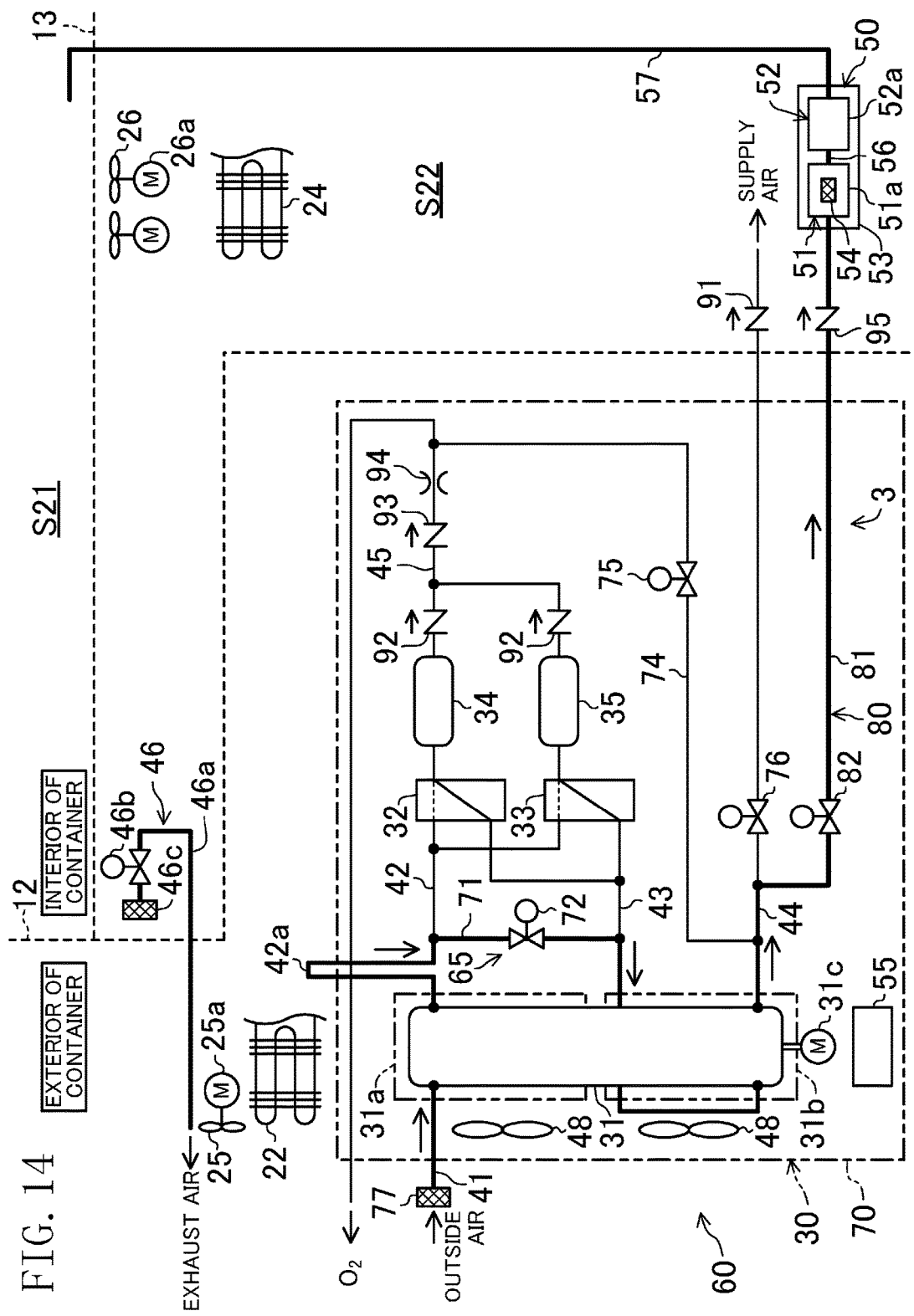
FIG. 14 is a piping diagram illustrating a configuration of the CA system in the container refrigeration apparatus of the second embodiment, together with the flow of air during an outside air calibration operation.

Specifically, similarly to the first embodiment, the first directional control valve (32) switches between a first state where the first adsorption column (34) is allowed to communicate with the outlet of the first pump mechanism (31a) and is blocked from the inlet of the second pump mechanism (31b) (the state shown in FIGS. 10 and 12), and a second state where the first adsorption column (34) is allowed to communicate with the inlet of the second pump mechanism (31b) and is blocked from the outlet of the first pump mechanism (31a) (the state shown in FIGS. 11, 13 and 14). On the other hand, the second directional control valve (33) switches between a first state where the second adsorption column (35) is allowed to communicate with the inlet of the second pump mechanism (31b) and is blocked from the outlet of the first pump mechanism (31a) (the state shown in FIGS. 10, 13 and 14), and a second state where the second adsorption column (35) is allowed to communicate with the outlet of the first pump mechanism (31a) and is blocked from the inlet of the second pump mechanism (31b) (the state shown in FIGS. 11 and 12).

If both of the first and second directional control valves (32) and (33) are set to be the first state, the air circuit (3) is switched to the first connection state similar to that of the first embodiment (see FIG. 10). If both of the first and second directional control valves (32) and (33) are set to be the second state, the air circuit (3) is switched to the second connection state similar to that of the first embodiment (see FIG. 11). If the first directional control valve (32) is set to be the first state and the second directional control valve (33) is set to be the second state, the air circuit (3) is switched to the third connection state similar to that of the first embodiment (see FIG. 12).

In the second embodiment, the air circuit (3) is switched to the fourth connection state shown in FIGS. 13 and 14, in addition to the first to third connection states (FIGS. 10-12) similar to those of the first embodiment, by the switching of the first and second directional control valves (32) and (33). Specifically, if the first directional control valve (32) is set to be the second state and the second directional control valve (33) is set to be the first state, the air circuit (3) is switched to the fourth connection state in which both of the first and second adsorption columns (34) and (35) are connected to the inlet of the second pump mechanism (31b) (see FIGS. 13 and 14). In this state, both of the first and second adsorption columns (34) and (35) are blocked from the outlet of the first pump mechanism (31a). That is, since the first and second adsorption columns (34) and (35) are blocked from the discharge passage (42), the compressed air which has been compressed by the first pump mechanism (31a) is not supplied into these adsorption columns.

(Adsorption Column)

The first and second adsorption columns (34) and (35) have configurations similar to those of the first embodiment. In the second embodiment, the nitrogen-enriched air may be 92% nitrogen and 8% oxygen, for example.

In the second embodiment, too, the respective other ends of the first and second adsorption columns (34) and (35) (functioning as outlets during pressurization) are connected to one end of the oxygen exhaust passage (gas discharge passage) (45). One end of the oxygen exhaust passage (45) is divided into two branches. The two branches are connected to the other ends of the first and second adsorption columns (34) and (35), respectively. Each of the junction portions is provided with a check valve (92) which prevents backflow of the air from the oxygen exhaust passage (45) toward the first and second adsorption columns (34) and (35). The other end of the oxygen exhaust passage (45) opens outside the gas supply device (30), i.e., outside the container (11). A check valve (93) and an orifice (94) are arranged at some midpoints of the oxygen exhaust passage (45) so as to be sequentially arranged from one end to the other end of the oxygen exhaust passage (45). The check valve (93) prevents backflow of the air from an exhaust connection passage (74), described later, toward the first and second adsorption columns (34) and (35). The orifice (94) depressurizes the oxygen-enriched air which has flowed out of the first and second adsorption columns (34) and (35) before the oxygen-enriched air is exhausted from the container.

(Flow Switching Mechanism)

In the second embodiment, too, the air circuit (3) includes a flow switching mechanism (65) which switches the state of flow of the air in the air circuit (3) between a first flow state where the nitrogen-enriched air produced in the first and second adsorption columns (34) and (35) is supplied into the container (11) by the air pump (31), and a second flow state where the outdoor air taken into the air circuit (3) is supplied into the container (11) by the air pump (31).

The flow switching mechanism (65) includes a bypass passage (71), a bypass open/close valve (72), and the first and second directional control valves (the switching mechanism) (32, 33).

The bypass passage (71) has one end connected to the discharge passage (42), and the other end connected to the suction passage (43). The one end of the bypass passage (71) is connected to the discharge passage (42) downstream of the cooling portion (42a). The other end of the bypass passage (71) is connected to the suction passage (43), not at the two branch portions connected to the first and second directional control valves (32, 33), but at a portion closer to the inlet of the second pump mechanism (31b) where the flows are merged.

The bypass open/close valve (72) is provided at some midpoint of the bypass passage (71), and is comprised of a solenoid valve which is switched between an open state where the air is allowed to flow through the bypass open/close valve (72), and a closed state where the air is prevented from flowing through the bypass open/close valve (72). The controller (55) controls an opening/closing operation of the bypass open/close valve (72). As will be described in detail later, the bypass open/close valve (72) is controlled to be the open state during the second flow state, and to be the closed state during the first flow state.

The configurations of the first and second directional control valves (the switching mechanism) (32, 33) are as described above. As will be described in detail later, in the second flow state, the first directional control valve (32) is set to be the second state, and the second directional control valve (33) is set to be the first state, so that the connection state between the air pump (31) and the first and second adsorption columns (34) and (35) in the air circuit (3) is switched to the fourth connection state.

(Supply-Exhaust Switching Mechanism)

The air circuit (3) is provided with a supply-exhaust switching mechanism which switches between a gas supply operation, described later, of supplying the produced nitrogen-enriched air into the container (11), and a gas exhaust operation of exhausting the produced nitrogen-enriched air to the outside of the container (11). The supply-exhaust switching mechanism includes an exhaust connection passage (74), an exhaust open/close valve (75), and a supply open/close valve (76).

The exhaust connection passage (74) has one end connected to supply passage (44), and the other end connected to the oxygen exhaust passage (45). The other end of the exhaust connection passage (74) is connected to the oxygen exhaust passage (45) so as to be located further toward the outside of the container than the orifice (63).

The exhaust open/close valve (75) is provided at the exhaust connection passage (74). The exhaust open/close valve (75) is provided at some midpoint of the exhaust connection passage (74), and is comprised of a solenoid valve which is switched between an open state where the air having flowed in from the supply passage (44) is allowed to flow through the exhaust connection passage (74), and a closed state where the air is prevented from flowing through the exhaust connection passage (74). The controller (55) controls an opening/closing operation of the exhaust open/close valve (75).

The supply open/close valve (76) is provided at the supply passage (44) so as to be located further toward the other end (toward the inside of the container) than the junction where the exhaust connection passage (74) is connected. The supply open/close valve (76) is provided at the supply passage (44) so as to be located further toward the inside of the container than the junction where the exhaust connection passage (74) is connected, and is comprised of a solenoid valve which is switched between an open state where the air is allowed to flow toward the inside of the container, and a closed state where the air is prevented from flowing toward the inside of the container. The controller (55) controls an opening/closing operation of the supply open/close valve (76).

(Measurement Unit)

Similarly to the first embodiment, the air circuit (3) of the second embodiment is provided with a measurement unit (80) used to perform a supply air measurement operation using an oxygen sensor (51) of a sensor unit (50). The measurement unit (80) of the second embodiment has a configuration similar to that of the first embodiment, except that a check valve (64) is provided at the other end portion (a portion located inside the container) of the branch pipe (81). The check valve (64) allows the air to flow only from one end to the other end of the branch pipe (81) and prevents backflow of the air.

—Operation Mechanism of Gas Supply Device—

In the second embodiment, too, the supply state of the gas supply device (30) is switched between the first supply state of supplying, as supply air, the nitrogen-enriched air produced from the outside air into the container (11), and the second supply state in which the gas supply device (30) takes outside air and supplies, as supply air, the outside air into the container (11).

«Operation in First Supply State»

The controller (55) switches the flow state of the air in the air circuit (3) to the first flow state, thereby switching the supply state of the gas supply device (30) to the first supply state. Specifically, the controller (55) operates the air pump (31) with the bypass open/close valve (72) closed. The controller (55) controls the first and second directional control valves (32) and (33) such that the connection state between the air pump (31) and the first and second adsorption columns (34) and (35) is switched alternately between the first and second connection states at predetermined intervals (e.g., every 14.5 seconds). Thus, a first operation in which the first adsorption column (34) is pressurized and the second adsorption column (35) is depressurized (see FIG. 10), and a second operation in which the first adsorption column (34) is depressurized and the second adsorption column (35) is pressurized (see FIG. 11) are alternately repeated every predetermined time so as to produce the nitrogen-enriched air and the oxygen-enriched air. Further, in the second embodiment, the controller (55) switches the connection state between the air pump (31) and the first and second adsorption columns (34) and (35) to the third connection state for predetermined time (e.g., 1.5 seconds) during the intervals between switching operations between the first connection state and the second connection state, thereby performing a pressure equalization operation (see FIG. 12) in which both of the first and second adsorption columns (34) and (35) are pressurized.

«First Operation»

As illustrated in FIG. 10, during the first operation, the controller (55) switches both of the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a). In the first connection state, the outside air compressed by the first pump mechanism (31a) is supplied to the first adsorption column (34), whereas the second pump mechanism (31b) sucks from the second adsorption column (35) the nitrogen-enriched air having a higher nitrogen concentration and a lower oxygen concentration than the outside air.

Specifically, the first pump mechanism (31a) sucks the outside air through the outside air passage (41) and compresses the outside air. The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to the first adsorption column (34).

The cooled compressed air flows into the first adsorption column (34) in this manner. The nitrogen component contained in the compressed air is adsorbed onto the adsorbent. The adsorption performance of the adsorbent improves as the temperature of the adsorbent drops. Thus, cooling the compressed air in advance in the cooling portion (42a) as mentioned above improves the adsorption performance of the adsorbent, compared with the case where the compressed air is not cooled in advance. Thus, during the first operation, the first pump mechanism (31a) supplies the compressed outside air to the first adsorption column (34), in which the adsorbent adsorbs nitrogen component in the outside air, thereby producing oxygen-enriched air having a lower nitrogen concentration and a higher oxygen concentration than the outside air. The oxygen-enriched air flows from the first adsorption column (34) to the oxygen exhaust passage (45).

On the other hand, the second pump mechanism (31b) sucks the air from the second adsorption column (35). Simultaneously, the second pump mechanism (31b) also sucks the nitrogen component adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Second Operation»

Figure 5:
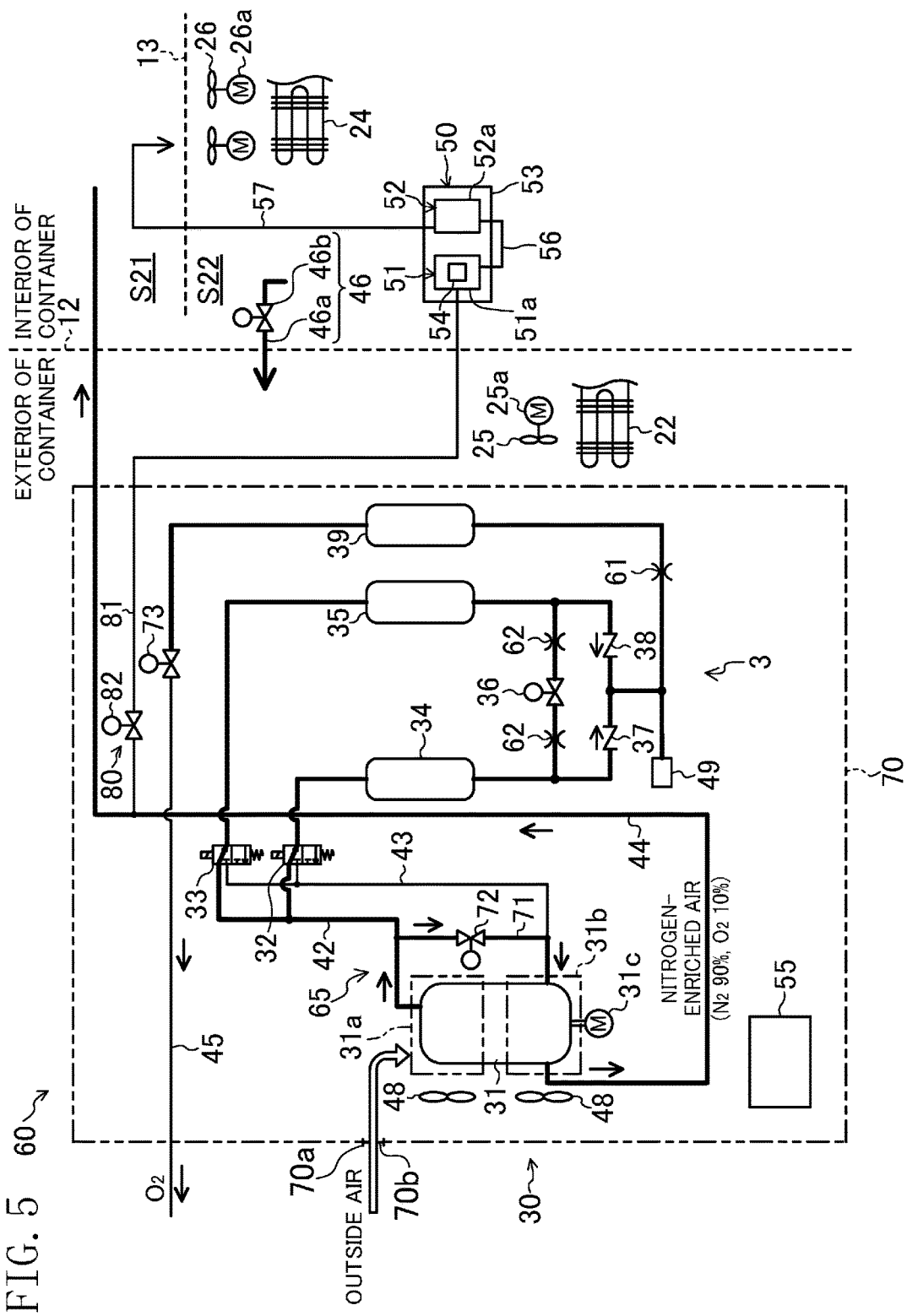
FIG. 5 is a piping diagram illustrating the configuration of the CA system in the container refrigeration apparatus of the first embodiment, together with the flow of air during a second flow state.

As illustrated in FIG. 11, during the second operation, the controller (55) switches both of the first and second directional control valves (32) and (33) to the second state shown in FIG. 5. Thus, the air circuit (3) is set to the second connection state where the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b). In the second connection state, the outside air compressed by the first pump mechanism (31a) is supplied to the second adsorption column (35), whereas the second pump mechanism (31b) sucks the nitrogen-enriched air from the first adsorption column (34).

Specifically, the first pump mechanism (31a) sucks the outside air through the outside air passage (41) and compresses the outside air. The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to the second adsorption column (35).

The cooled compressed air flows into the second adsorption column (35) in this manner. The nitrogen component contained in the compressed air is adsorbed onto the adsorbent. In the second operation, too, cooling the compressed air in advance in the cooling portion (42a) improves the adsorption performance of the adsorbent, compared with the case where the compressed air is not cooled in advance. Thus, during the second operation, the first pump mechanism (31a) supplies the compressed outside air to the second adsorption column (35), in which the adsorbent adsorbs the nitrogen component in the outside air, thereby producing oxygen-enriched air having a lower nitrogen concentration and a higher oxygen concentration than the outside air. The oxygen-enriched air flows from the second adsorption column (35) to the oxygen exhaust passage (45).

On the other hand, the second pump mechanism (31b) sucks the air from the first adsorption column (34). Simultaneously, the second pump mechanism (31b) also sucks the nitrogen component adsorbed onto the adsorbent in the first adsorption column (34) together with the air, thereby allowing the adsorbent to desorb nitrogen component. Thus, during the second operation, the second pump mechanism (31b) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

«Pressure Equalization Operation»

As illustrated in FIG. 12, during the pressure equalization operation, the controller (55) switches the first directional control valve (32) to the first state, and the second directional control valve (33) to the second state. Thus, the air circuit (3) is set to the third connection state where both of the first and second adsorption columns (34) and (35) communicate with the outlet of the first pump mechanism (31a) and are blocked from the inlet of the second pump mechanism (31b). In the third connection state, the outside air compressed by the first pump mechanism (31a) is supplied to both of the first and second adsorption columns (34) and (35), whereas the second pump mechanism (31b) sucks the nitrogen-enriched air remaining in the suction passage (43).

Specifically, the first pump mechanism (31a) sucks the outside air through the outside air passage (41) and compresses the outside air. The compressed outside air is discharged into the discharge passage (42). The compressed air discharged into the discharge passage (42) flows through the discharge passage (42) into the cooling portion (42a) provided outside the unit case (70) and in the external storage space (S1). The compressed air is cooled through heat exchange with the outside air while passing through the cooling portion (42a), and is then supplied to both of the first and second adsorption columns (34) and (35).

In the first and second adsorption columns (34) and (35), the nitrogen component contained in the compressed air which has flowed into the columns (34) and (35) is adsorbed onto the adsorbent, and the oxygen-enriched air is produced. The oxygen-enriched air flows from the first and second adsorption columns (34) and (35) to the oxygen exhaust passage (45).

On the other hand, the second pump mechanism (31b) is blocked from the first and second adsorption columns (34) and (35). Thus, in the pressure equalization operation, no further nitrogen-enriched air is produced in the first and second adsorption columns (34) and (35). The second pump mechanism (31b) sucks and compresses the nitrogen-enriched air remaining in the suction passage (43), and discharges the compressed nitrogen-enriched air into the supply passage (44).

As mentioned above, in the first operation, the first adsorption column (34) is pressurized by the first pump mechanism (31a), thereby performing the adsorption operation, whereas the second adsorption column (35) is depressurized by the second pump mechanism (31b), thereby performing the desorption operation. On the other hand, in the second operation, the second adsorption column (35) is pressurized by the first pump mechanism (31a), thereby performing the adsorption operation, whereas the first adsorption column (34) is depressurized by the second pump mechanism (31b), thereby performing the desorption operation. Thus, if the first operation is switched to the second operation or the second operation is switched to the first operation without the pressure equalization operation performed during the interval between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). Due to this configuration, the inner pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is immediately performed after the connection with the first pump mechanism (31a).

In this manner, the gas supply device (30) alternately repeats the first and second operations, with the pressure equalization operation performed during the intervals, thereby producing the nitrogen-enriched air and the oxygen-enriched air in the air circuit (3).

Further, in the first flow state, the controller (55) instructs the bypass open/close valve (72) to close, so that the first and second directional control valves (32, 33) are controlled to be switched among the first to third connection states (communication states) as described above. Then, the bypass passage (71) is closed, and the first and second adsorption columns (34, 35) alternately communicate with the discharge passage (42). As a result, the nitrogen-enriched air produced alternately in the first and second adsorption columns (34) and (35) is supplied into the container (11) through the supply passage (44). At this moment, the oxygen-enriched air is exhausted to the outside of the container through the oxygen exhaust passage (45).

In this manner, in the first flow state, a gas supply operation is performed in which the nitrogen-enriched air produced in the first and second adsorption columns (34) and (35) is supplied into the container (11). That is, the gas supply device (30) is set to the first supply state supplying, as supply air, the nitrogen-enriched air produced from the outside air into the container (11) via the supply passage (44).

«Operation in Second Supply State»

The controller (55) switches the flow state of the air in the air circuit (3) to the second flow state, thereby switching the supply state of the gas supply device (30) to the second supply state. Specifically, the controller (55) instructs the bypass open/close valve (72) to open, switches the connection state between the air pump (31) and the first and second adsorption columns (34) and (35) to the fourth connection state, and operates the air pump (31).

In the second flow state, the bypass passage (71) is open, and the first and second adsorption columns (34, 35) are blocked from (not connected to) the discharge passage (42). Thus, the outside air compressed by the first pump mechanism (31a) of the air pump (31) is not guided into the first and second adsorption columns (34, 35), and flows into the bypass passage (71) and is sucked into the second pump mechanism (31b) of the air pump (31). That is, the outside air compressed by the first pump mechanism (31a) is sucked directly into the second pump mechanism (31b). The outside air which has been sucked into the second pump mechanism (31b) is compressed and supplied into the container via the supply passage (44).

In this manner, in the second flow state, an outside air introduction operation is performed in which the outside air which has been taken into the air circuit (3) is directly supplied into the container (11) by the pressure applied by the second pump mechanism (31b) of the air pump (31). That is, the gas supply device (30) is set to the second supply state supplying, as supply air, the outside air taken therein into the container (11) via the supply passage (44).

The configurations of the exhaust portion (46), the sensor unit (50), and the controller (55) are the same as, or similar to, those of the first embodiment.

—Operation—

The operation of the refrigerant circuit is similar to that of the refrigerant circuit in the first embodiment. The explanation thereof will thus be omitted. On the other hand, in the second embodiment, the CA system (60) performs the following concentration control operation.

<Concentration Control Operation>

In the second embodiment, the controller (55) instructs the CA system (60) to perform a concentration control operation of controlling the composition of the air in the container (11) (oxygen concentration and carbon dioxide concentration) to a desired composition (e.g., 5% oxygen and 5% carbon dioxide). In the concentration control operation, the controller (55) controls the operation of the gas supply device (30) and the exhaust portion (46) based on measurement results obtained by the oxygen sensor (51) and the carbon dioxide sensor (52) so that the composition of the air in the container (11) will be a desired composition.

During the concentration control operation, the controller (55) instructs the measurement on-off valve (82) to close. Further, during the concentration control operation, the controller (55) communicates with the unit controller (100) to instruct the unit controller (100) to rotate the internal fans (26). Thus, the air in the container is supplied to the oxygen sensor (51) and the carbon dioxide sensor (52) by the internal fans (26), and then the oxygen concentration and carbon dioxide concentration of the air in the container are measured.

(Control of Oxygen Concentration)

If the oxygen concentration of the air in the container measured by the oxygen sensor (51) is higher than 8%, the controller (55) performs the gas supply operation in which nitrogen-enriched air is produced and supplied into the container (11).

Specifically, the controller (55) alternately repeats the first operation (see FIG. 10) and the second operation (see FIG. 11), with the pressure equalization operation (see FIG. 12) performed during the intervals, by switching of the first and second directional control valves (32) and (33), thereby producing nitrogen-enriched air having a higher nitrogen concentration and lower oxygen concentration than the outside air. In this embodiment, the operational time of the first and second operations is set to be 14.5 seconds each, and the operational time of the pressure equalization operation is set to be 1.5 seconds. Further, the controller (55) instructs the exhaust open/close valve (75) to close and the supply open/close valve (76) to open to perform the gas supply operation of supplying the nitrogen-enriched air produced in the gas production operation described above into the container (11). In this embodiment, the nitrogen-enriched air having a mean nitrogen concentration of 92% (i.e., a mean value of the nitrogen concentration of the nitrogen-enriched air supplied into the container in each of the first and second operations) and a mean oxygen concentration of 8% (i.e., a mean value of the oxygen concentration of the nitrogen-enriched air supplied into the container in each of the first and second operations) is supplied into the container (11).

Further, the controller (55) instructs the exhaust valve (46b) of the exhaust portion (46) to open to perform the exhaust operation, so that the air in the container (11) is exhausted to the exterior of the container only by the amount of the nitrogen-enriched air supplied to the interior of the container (11) during the gas supply operation.

In the concentration control operation, the air in the container is replaced with the nitrogen-enriched air by the above-described gas supply operation and exhaust operation, thereby reducing the oxygen concentration of the air in the container.

When the oxygen concentration of the air in the container (11) is reduced to 8%, the controller (55) stops the operation of the gas supply device (30) to stop the gas supply operation, and also closes the exhaust valve (46b) to stop the exhaust operation.

When the gas supply operation and the exhaust operation are stopped, the air in the container (11) is no longer replaced, but the plants (15) keep breathing. Therefore, the oxygen concentration of the air in the container (11) decreases and the carbon dioxide concentration of the air in the container (11) increases. The oxygen concentration of the air in the container will eventually reach the target oxygen concentration of 5%.

If the oxygen concentration of the air in the container (11) falls below 5% due to the breathing, the controller (55) performs oxygen concentration increasing control of increasing the oxygen concentration of the air in the container (11).

In the oxygen concentration increasing control, the controller (55) switches the air circuit (3) to the second flow state, and performs an outside air introduction operation of supplying the outside air taken in the air circuit (3) to the interior of the container (11). Simultaneously, the controller (55) instructs the exhaust valve (46b) of the exhaust portion (46) to open to perform the exhaust operation, so that the air in the container is exhausted out of the container only by the amount of the outside air supplied to the interior of the container (11) during the outside air introduction operation. Through the outside air introduction operation and exhaust operation thus performed, the air in the container is replaced with the outside air, and thus, the oxygen concentration of the air in the container (11) increases.

When the oxygen concentration of the air in the container becomes higher than the target oxygen concentration (i.e., 5%) by a predetermined concentration (e.g., 0.5%), that is, 5.5%, the controller (55) stops the outside air introduction operation and the exhaust operation to end the oxygen concentration increasing control.

The oxygen concentration of the air in the container may also be controlled by the gas supply operation of supplying the produced nitrogen-enriched air into the container (11), instead of by the outside air introduction operation. Through the gas supply operation and the exhaust operation, the air in the container is replaced with the nitrogen-enriched air having a higher oxygen concentration (e.g., a mean oxygen concentration of 8%) than the air in the container. Thus, the oxygen concentration of the air in the container (11) increases.

(Control of Carbon Dioxide Concentration)

If the carbon dioxide concentration of the air in the container measured by the carbon dioxide sensor (52) is higher than 5%, the controller (55) performs carbon dioxide concentration lowering control of lowering the carbon dioxide concentration of the air in the container.

In the carbon dioxide concentration lowering control, the controller (55) first switches the air circuit (3) to the first flow state, operates the gas supply device (30) to perform a gas supply operation in which nitrogen-enriched air (a mean nitrogen concentration of 92% and a mean oxygen concentration of 8%) is produced in the air circuit (3) and the nitrogen-enriched air is supplied into the container (11), and also opens the exhaust valve (46b) to perform the exhaust operation. Through the gas supply operation and the exhaust operation thus performed, the air in the container is replaced with the nitrogen-enriched air having a carbon dioxide concentration of 0.03%. Thus, the carbon dioxide concentration of the air in the container (11) is lowered.

If the carbon dioxide concentration of the air in the container becomes lower than the target carbon dioxide concentration (i.e., 5%) by a predetermined concentration (e.g., 0.5%), that is, 4.5%, the controller (55) stops the operation of the gas supply device (30) to stop the gas supply operation and the exhaust operation, thereby ending the carbon dioxide concentration lowering control.

Note that, in the carbon dioxide concentration lowering control, the air circuit (3) may be switched to the second flow state to perform the outside air introduction operation of supplying the outside air taken into the air circuit (3) to the interior of the container (11), instead of the gas supply operation. Through the gas supply operation and the exhaust operation thus performed, the air in the container is replaced with the outside air having a carbon dioxide concentration of 0.03%. Thus, the carbon dioxide concentration of the air in the container (11) is lowered.

<Supply Air Measurement Operation>

Further, in the second embodiment, too, the controller (55) performs a supply air measurement operation of measuring the oxygen concentration of the nitrogen-enriched air produced in the gas supply device (30) in accordance with a command entered by a user or periodically (e.g., every ten days). Specifically, the controller (55) instructs the measurement on-off valve (82) to open and the supply open/close valve (76) to close during the gas supply operation, that is, while the gas supply device (30) is in the first supply state in which the nitrogen-enriched air produced from the outside air in the first and second adsorption columns (34) and (35) is supplied into the controller (11). As a result, all the nitrogen-enriched air flowing through the supply passage (44) flows into the branch pipe (81). The nitrogen-enriched air that has flowed into the branch pipe (81) flows into the oxygen sensor (51), which measures the oxygen concentration of the nitrogen-enriched air.

In this manner, whether the composition (oxygen concentration and nitrogen concentration) of the nitrogen-enriched air produced in the gas supply device (30) is in a desired state or not may be determined by measuring the oxygen concentration of the nitrogen-enriched air produced in the gas supply device (30).

Note that the nitrogen-enriched air which has passed through the oxygen sensor (51) in the air passage (58) passes through the carbon dioxide sensor (52). Thus, the carbon dioxide concentration of the nitrogen-enriched air may be measured by the carbon dioxide sensor (52) in the supply air measurement operation to calibrate the carbon dioxide sensor (52). The nitrogen-enriched air is produced by replacing part of oxygen in the outside air (having a carbon dioxide concentration of 0.03%) with nitrogen. Thus, the carbon dioxide concentration of the nitrogen-enriched air is almost the same as that of the outside air. The carbon dioxide sensor (52) can thus be calibrated by correcting the settings such that the carbon dioxide concentration of the nitrogen-enriched air measured by the carbon dioxide sensor (52) will be 0.03%.

<Outside Air Calibration Operation>

In the second embodiment, too, the controller (55) performs an outside air calibration operation in which the oxygen sensor (51) and the carbon dioxide sensor (52) are calibrated using the outside air in accordance with a command entered by a user or periodically (e.g., every ten days).

Note that the outside air calibration operation is performed concurrently when the internal fans (26) are stopped during the outside air introduction operation for the concentration control operation described above or test run.

Specifically, the controller (55) instructs the measurement on-off valve (82) to open and the supply open/close valve (76) to close during the outside air introduction operation, that is, while the gas supply device (30) is in the second supply state (see FIG. 13) in which the outside air is taken into the gas supply device (30) and is supplied into the container (11) by the pressure applied by the second pump mechanism (3b). As a result, as shown in FIG. 14, all the outside air passing through the supply passage (44) flows into the branch pipe (81) and is guided into the oxygen sensor box (51a). The outside air which has flowed into the oxygen sensor box (51a) sequentially passes through the oxygen sensor (51) and the carbon dioxide sensor (52) which are connected to the air passage (58). In the outside air calibration operation, the oxygen sensor (51) and the carbon dioxide sensor (52) are calibrated using this outside air. Particular calibration operations are the same as, or similar to, those of the first embodiment.

Since the oxygen sensor (51) is calibrated using at least part of the outside air supplied into the container (11) in the second embodiment as described above, the oxygen sensor (51) may be calibrated at any timing. Further, since the outside air is guided to the oxygen sensor (51) through the branch pipe (81), it is not necessary, unlike the known techniques, to wait for the air in the container (11) to be replaced with the outside air. This allows the calibration to be performed promptly at any timing.

In the second embodiment, the outside air calibration operation is performed with the open/close valve (82) open and the supply open/close valve (76) closed during the outside air introduction operation, that is, while the gas supply device (30) is in the second supply state (see FIG. 13). Thus, the second embodiment differs from the first embodiment in that all of the outside air which has flowed into the supply passage (44) flows into the branch pipe (81) and is guided to the oxygen sensor (51) during the outside air calibration operation. However, similarly to the first embodiment, part of the outside air which has flowed into the supply passage (44) may flow into the branch pipe (81) and be guided to the oxygen sensor (51), with the open/close valve (82) open without closing the supply open/close valve (76), during the outside air introduction operation in the second embodiment.

«Other Embodiments»

The above embodiments may also be configured as follows.

The controller (55) may perform the supply air measurement operation periodically and store the measured oxygen concentration of the nitrogen-enriched air with the time when the measurement is performed. In such a case, whether the gas supply device (30) malfunctions or not may be determined from chronological changes in oxygen concentration of the nitrogen-enriched air.

Further, the he controller (55) may perform the outside air calibration operation periodically and store values corrected in the calibration operation with the time when the calibration is performed. In such a case, changes of the sensors (51, 52) with time may be recognized from the chronological changes in the corrected values. Further, when to replace the sensors (51, 52) may be determined from such changes with time.

In the above embodiments, the air pump (31) has the first and second pump mechanisms (31a) and (31b), and nitrogen-enriched air is sucked by the second pump mechanism (31b) of the air pump (31). However, another pump for sucking the nitrogen-enriched air may also be provided.

According to the above-described embodiments, two adsorption columns, i.e., the first and second adsorption columns (34) and (35), have been used for adsorption and desorption of nitrogen. However, the number of the adsorption columns is not limited to any number. For example, six adsorption columns may be used.

According to the above-described embodiments, the gas supply device (30) of the present invention is applied to a container refrigeration apparatus (10) provided for a container (11) for use in marine transportation. However, the gas supply device (30) of the present invention is not limited to such an application. The gas supply device (30) of the present invention may be used to control the composition of the air not only in a container for use in marine transportation, but also in a container for use in land transportation, a simple refrigerated storage, a normal temperature storage, or any other suitable storage, for example.

INDUSTRIAL APPLICABILITY

As described above, the present invention is useful as a container refrigeration apparatus which controls the temperature and composition of air in a container to be a desired state.

DESCRIPTION OF REFERENCE CHARACTERS

10 Container Refrigeration Apparatus
11 Container
15 Plants (15)
20 Refrigerant Circuit
24 Evaporator
26 Internal Fan (Fan)
30 Gas Supply Device
31a First Pump Mechanism
31b Second Pump Mechanism
34 First Adsorption Column (First Adsorption Portion)
35 Second Adsorption Column (Second Adsorption Portion)
44 Supply Passage
51 Oxygen Sensor
52 Carbon Dioxide Sensor
58 Air Passage
60 CA System (Inside Air Control System)
71 Bypass Passage
72 Bypass Open/Close Valve
81 Branch Pipe
82 Measurement On-Off Valve (Open/Close Valve)

The invention claimed is:

1. A container refrigeration apparatus attached to a container in which a breathing plant is housed, the apparatus comprising:
    a refrigerant circuit to which an evaporator that allows air in the container to exchange heat with a refrigerant is connected, and in which the refrigerant circulates to perform a refrigeration cycle; and
    an inside air control system which has: a gas supply device having a supply passage which communicates with an inside of the container and through which supply air is supplied into the container; and an oxygen sensor which measures an oxygen concentration of the air in the container, the inside air control system controlling the oxygen concentration of the air in the container to be a target concentration, wherein
    a supply state of the gas supply device is switched between a first supply state of producing, from outside air, nitrogen-enriched air having a higher nitrogen concentration and lower oxygen concentration than the outside air, and supplying, as the supply air, the nitrogen-enriched air into the container, and a second supply state in which the gas supply device takes outside air therein and supplies, as the supply air, the outside air into the container,
    the inside air control system has
        a branch pipe which is connected to the supply passage and guides at least part of the supply air flowing through the supply passage to the oxygen sensor, and
        an open/close valve which opens/closes the branch pipe, and
    the inside air control system performs an outside air calibration operation in which the open/close valve is opened in the second supply state, and the at least part of the outside air flowing through the supply passage is guided to the oxygen sensor to calibrate the oxygen sensor using the outside air.

2. The container refrigeration apparatus of claim 1, further comprising:
    a fan which forms a flow of air that passes through the evaporator and circulates in the container; and
    an air passage having one end open on a blowout side of the fan and the other end open on a suction side of the fan, wherein
    the oxygen sensor is provided at the air passage so as to measure an oxygen concentration of air flowing through the air passage,
    the branch pipe is connected to the air passage to allow the supply air flowing through the branch pipe to flow into the air passage, and
    the inside air control system performs the outside air calibration operation while the fan stops rotating.

3. The container refrigeration apparatus of claim 2, wherein
    the air passage is provided with a carbon dioxide sensor which measures a carbon dioxide concentration of the air flowing through the air passage, and
    the inside air control system is configured to calibrate the oxygen sensor and the carbon dioxide sensor in the outside air calibration operation, using the outside air which has flowed into the air passage through the branch pipe.

4. The container refrigeration apparatus of claim 3, wherein
    the inside air control system performs a supply air measurement operation in which, while the fan stops rotating, the open/close valve is opened in the first supply state, and at least part of the nitrogen-enriched air flowing through the supply passage is guided to the oxygen sensor, and an oxygen concentration of the nitrogen-enriched air is measured by the oxygen sensor.

5. The container refrigeration apparatus of claim 4, wherein
    in the supply air measurement operation, the inside air control system measures the oxygen concentration of the nitrogen-enriched air which has flowed into the air passage through the branch pipe by the oxygen sensor, and calibrates the carbon dioxide sensor (52) using the nitrogen-enriched air.

6. The container refrigeration apparatus of claim 1, wherein
the gas supply device has
a first pump mechanism which sucks, compresses, and discharges outside air,
a second pump mechanism which sucks, compresses, and discharges air,
a first adsorption portion and a second adsorption portion each having an adsorbent which adsorbs nitrogen in air, the first and second adsorption portions and being alternately connected to an outlet of the first pump mechanism and an inlet of the second pump mechanism,
the first and second adsorption portion, when connected to the outlet of the first pump mechanism and supplied with the compressed outside air, allowing the nitrogen in the outside air to be adsorbed onto the adsorbent and thereby producing oxygen-enriched air, and when connected to the inlet of the second pump mechanism which sucks the air inside, allowing the nitrogen adsorbed onto the adsorbent to be desorbed from the adsorbent and thereby producing nitrogen-enriched air,
the supply passage which is connected to an outlet of the second pump mechanism and guides the air discharged from the second pump mechanism into the container as the supply air,
a bypass passage which guides the outside air discharged from the first pump mechanism to the second pump mechanism while bypassing the first and second adsorption portions and), and
a bypass passage open/close valve which opens/closes the bypass passage,
when the bypass open/close valve is closed, the gas supply device is switched to the first supply state, and
when the bypass open/close valve is open, the gas supply device is switched to the second supply state.

7. The container refrigeration apparatus of claim 2, wherein
the gas supply device has
a first pump mechanism which sucks, compresses, and discharges outside air,
a second pump mechanism which sucks, compresses, and discharges air,
a first adsorption portion and a second adsorption portion each having an adsorbent which adsorbs nitrogen in air, the first and second adsorption portions and being alternately connected to an outlet of the first pump mechanism and an inlet of the second pump mechanism,
the first and second adsorption portion, when connected to the outlet of the first pump mechanism and supplied with the compressed outside air, allowing the nitrogen in the outside air to be adsorbed onto the adsorbent and thereby producing oxygen-enriched air, and when connected to the inlet of the second pump mechanism which sucks the air inside, allowing the nitrogen adsorbed onto the adsorbent to be desorbed from the adsorbent and thereby producing nitrogen-enriched air,
the supply passage which is connected to an outlet of the second pump mechanism and guides the air discharged from the second pump mechanism into the container as the supply air,
a bypass passage which guides the outside air discharged from the first pump mechanism to the second pump mechanism while bypassing the first and second adsorption portions and, and
a bypass passage open/close valve which opens/closes the bypass passage,
when the bypass open/close valve is closed, the gas supply device is switched to the first supply state, and
when the bypass open/close valve is open, the gas supply device is switched to the second supply state.

8. The container refrigeration apparatus of claim 3, wherein
the gas supply device has
a first pump mechanism which sucks, compresses, and discharges outside air,
a second pump mechanism which sucks, compresses, and discharges air,
a first adsorption portion and a second adsorption portion each having an adsorbent which adsorbs nitrogen in air, the first and second adsorption portions and being alternately connected to an outlet of the first pump mechanism and an inlet of the second pump mechanism,
the first and second adsorption portion, when connected to the outlet of the first pump mechanism and supplied with the compressed outside air, allowing the nitrogen in the outside air to be adsorbed onto the adsorbent and thereby producing oxygen-enriched air, and when connected to the inlet of the second pump mechanism which sucks the air inside, allowing the nitrogen adsorbed onto the adsorbent to be desorbed from the adsorbent and thereby producing nitrogen-enriched air,
the supply passage which is connected to an outlet of the second pump mechanism and guides the air discharged from the second pump mechanism into the container as the supply air,
a bypass passage which guides the outside air discharged from the first pump mechanism to the second pump mechanism while bypassing the first and second adsorption portions and, and
a bypass passage open/close valve which opens/closes the bypass passage,
when the bypass open/close valve is closed, the gas supply device is switched to the first supply state, and
when the bypass open/close valve is open, the gas supply device is switched to the second supply state.

9. The container refrigeration apparatus of claim 4, wherein
the gas supply device has
a first pump mechanism which sucks, compresses, and discharges outside air,
a second pump mechanism which sucks, compresses, and discharges air,
a first adsorption portion and a second adsorption portion each having an adsorbent which adsorbs nitrogen in air, the first and second adsorption portions and being alternately connected to an outlet of the first pump mechanism and an inlet of the second pump mechanism,
the first and second adsorption portion, when connected to the outlet of the first pump mechanism and supplied with the compressed outside air, allowing the nitrogen in the outside air to be adsorbed onto the adsorbent and thereby producing oxygen-enriched air, and when connected to the inlet of the second pump mechanism which sucks the air inside, allowing the nitrogen adsorbed onto the adsorbent to be desorbed from the adsorbent and thereby producing nitrogen-enriched air, the supply passage which is connected to an outlet of the second pump mechanism and guides the air discharged from the second pump mechanism into the container as the supply air, a bypass passage which guides the outside air discharged from the first pump mechanism to the second pump mechanism while bypassing the first and second adsorption portions and, and a bypass passage open/close valve which opens/closes the bypass passage, when the bypass open/close valve is closed, the gas supply device is switched to the first supply state, and when the bypass open/close valve is open, the gas supply device is switched to the second supply state.

10. The container refrigeration apparatus of claim 5, wherein the gas supply device has a first pump mechanism which sucks, compresses, and discharges outside air, a second pump mechanism which sucks, compresses, and discharges air, a first adsorption portion and a second adsorption portion each having an adsorbent which adsorbs nitrogen in air, the first and second adsorption portions and being alternately connected to an outlet of the first pump mechanism and an inlet of the second pump mechanism, the first and second adsorption portion, when connected to the outlet of the first pump mechanism and supplied with the compressed outside air, allowing the nitrogen in the outside air to be adsorbed onto the adsorbent and thereby producing oxygen-enriched air, and when connected to the inlet of the second pump mechanism which sucks the air inside, allowing the nitrogen adsorbed onto the adsorbent to be desorbed from the adsorbent and thereby producing nitrogen-enriched air, the supply passage which is connected to an outlet of the second pump mechanism and guides the air discharged from the second pump mechanism into the container as the supply air, a bypass passage which guides the outside air discharged from the first pump mechanism to the second pump mechanism while bypassing the first and second adsorption portions and, and a bypass passage open/close valve which opens/closes the bypass passage, when the bypass open/close valve is closed, the gas supply device is switched to the first supply state, and when the bypass open/close valve is open, the gas supply device is switched to the second supply state.

* * * * *